United States Patent [19]
Aoshima

[11] Patent Number: 5,384,506
[45] Date of Patent: Jan. 24, 1995

[54] STEPPER MOTOR
[75] Inventor: Chikara Aoshima, Zama, Japan
[73] Assignee: Canon Kabushiki Kaisha, Tokyo, Japan
[21] Appl. No.: 67,043
[22] Filed: May 25, 1993
[30] Foreign Application Priority Data
May 29, 1992 [JP] Japan ................................. 4-163740
Feb. 23, 1993 [JP] Japan ................................. 5-057927
[51] Int. Cl.⁶ ............................................ H02K 37/12
[52] U.S. Cl. ................................. 310/49 R; 310/162
[58] Field of Search ..................... 310/49 R, 162–165

[56] References Cited
U.S. PATENT DOCUMENTS

| | | | |
|---|---|---|---|
| 4,680,494 | 7/1987 | Grosjean | 310/156 |
| 4,739,201 | 4/1988 | Brigham et al. | 310/49 R |
| 4,764,697 | 8/1988 | Christaens | 310/49 R |
| 4,806,813 | 2/1989 | Sumi et al. | 310/254 |
| 4,958,099 | 9/1990 | Chigira et al. | 310/254 |

FOREIGN PATENT DOCUMENTS

| | | |
|---|---|---|
| 63-113127 | 7/1988 | Japan . |
| 3180822 | 8/1991 | Japan . |
| 450810 | 4/1992 | Japan . |

Primary Examiner—Steven L. Stephan
Assistant Examiner—Judson H. Jones
Attorney, Agent, or Firm—Fitzpatrick, Cella, Harper & Scinto

[57] ABSTRACT

A stepper motor includes a cylindrical rotor, a plurality of stators, a plurality of yokes, and a plurality of coils. The cylindrical rotor is made of a permanent magnet which has been magnetized radially. The rotor has two magnetized layers formed in an axial direction thereof. Each of the stators has a plurality of magnetic pole portions which are disposed such that they oppose an outer periphery of the rotor. The magnetic pole portions of the stators oppose one of the magnetized layers of the rotor. The plurality of yokes are made of a permeable material. The yokes are separated from the stators in the axial direction of the rotor. The end portions of the yokes oppose the other magnetized layer of the rotor. The plurality of yokes are shifted from the stators by a predetermined angle. The plurality of coils are disposed such that each coil excites a corresponding stator. By this arrangement, the diameter of the lens barrel of a camera containing such a stepping motor can be reduced and the output and efficiency of the stepper motor can be improved.

11 Claims, 35 Drawing Sheets

STEPPER MOTOR

BACKGROUND OF THE INVENTION

1. Field of the Invention

The present invention relates to a stepper motor, and more particularly, to a lens driving device for cameras and a stepper motor suitable for use in such a lens driving device.

2. Description of the Related Art

Motors having a structure which allows a motor to be easily disposed within the lens barrel of a camera as a lens driving device thereof have been proposed in, for example, U.S. Pat. Nos. 4,806,813 and 4,958,099.

Stepper motors for driving the shutter blade or photographic lens of a camera have been disclosed in, for example, Japanese Utility Model Laid-Open No. sho 63-113127. This stepper motor includes a rotor 92 which is divided in the circumferential direction thereof and magnetized radially, a plurality of stators 93 and 94, each of which has a plurality of magnetic poles disposed around the rotor 92 in such a manner that they face the rotor 92, and coils 95 and 96 disposed on parts of the stators 93 and 94 in order to magnetize the stators, respectively, as shown in FIG. 40. The entire stepper motor is disposed on a barrel base plate 91 substantially in the form of an arc so that it can be readily disposed within the lens barrel of the camera.

More specifically, the rotor 92 is mounted on the barrel base plate 91 in such a manner as to be rotatable. As shown in FIG. 40, the rotor 92 is divided into four portions in the circumferential direction. These four portions alternately have south and north magnetic poles. The stators 93 and 94 have magnetic poles 93a, 93b and 94a, 94b, respectively, which are disposed around the rotor in such a manner that they oppose the rotor. In the stepper motor, the rotor is rotated in either direction by switching over energization of the coils. The rotation of the rotor is used to drive the shutter blade (not shown) or photographic lens (not shown).

However, in the above-described conventional stepper motor, the respective magnetic poles 93a, 93b, 94a and 94b of the stators 93 and 94 must be disposed two-dimensionally, as shown in FIG. 40. Thus, the reduction in the width I of the stepper motor is limited, in turn limiting the reduction of a diameter D of the lens barrel.

Also, the above-described conventional stepper motor has the following drawback. When the photographic lens is driven by the stepper motor, movement of the lens must be stopped during the exposure operation. Generally, the rotor is stopped at predetermined rotational positions by the cogging torque generated between the magnetized portions and the stators. However, there are only four rotational positions where the rotor can be retained stably by the cogging torque. These four rotational positions, shown in FIGS. 40 and 41, are those obtained each time the rotor is rotated by 90° (FIG. 40 shows two states out of phase by 180° among these four rotational positions, and FIG. 41 shows the other two positions out of phase by 180°). In this stepper motor, the rotor can also be retained at four positions, shown in FIGS. 42 and 43, obtained each time the rotor is rotated by 90° by energizing the coils 95 and 96. However, since the cogging torque obtained at each of the rotational positions shown in FIGS. 42 and 43 is very small, when the coils are deenergized, the rotor may not be retained stably. Hence, when the positions shown in FIGS. 42 and 43 are used as those at which the movement of the photographic lens is stopped, the coils must be kept energized so that the rotor can be retained at the positions shown in FIGS. 42 and 43 by the electromagnetic force generated by the energization of the coils.

To perform exposure control during operation of the camera, an actuator for driving an exposure control mechanism (not shown) must be energized. Taking into account the fact that an electric cell is used as the power source of the camera, it is not desirable to energize the actuator for moving the photographic lens, i.e., the coils 95 and 96, during the exposure operation.

In the lens driving device for cameras, it is desirable to move the lens along the optical axis accurately by sliding a guide shaft for retaining a lens frame along a guide hole disposed on the optical axis. However, in conventional lens driving devices disclosed in, for example, Japanese Patent Laid-Open No. hei 3-180822 and Japanese Utility Model Laid-Open No. hei 4-50810, a guide portion for positioning the lens and a threaded portion for driving the lens are disposed separately.

In the above-described lens driving devices, since the force which drives the lens or lens frame along the optical axis acts on a site different from the guide portion, the lens or lens frame may be inclined, or the lens frame may be deflected. These increase the friction of the guide portion and increase the driving load.

SUMMARY OF THE INVENTION

In view of the aforementioned problems of a conventional stepper motor, a primary object of the present invention is to provide a stepper motor having a structure which enables the diameter of a lens barrel of a camera to be reduced.

A second object of the present invention is to provide a stepper motor having a structure which enables the diameter of a lens barrel of a camera to be reduced, and which can prevent a reduction in a generated driving torque.

A third object of the present invention is no provide a stepper motor having a structure which enables the motor to be utilized in a photographic lens moving operation without performing energization required to move the photographic lens even during the exposure operation of a camera.

According to one aspect, the present invention which achieves at least one of these objectives relates to a stepping motor comprising a cylindrical rotor, a plurality of stators, a plurality of yokes, and a plurality of coils. The cylindrical rotor is made of a permanent magnet which has been magnetized radially. The rotor has two magnetized layers formed in an axial direction thereof. Each of stators has a plurality of magnetic pole portions which are disposed such that they oppose an outer periphery of the rotor. The magnetic pole portions of the stators oppose one of the magnetized layers of the rotor. The plurality of yokes are made of a permeable material. The yokes are separated from the stators in an axial direction of the rotor. The end portions of the yokes oppose the other magnetized layer of the rotor. The plurality of yokes are shifted from the stators at a predetermined angle. The plurality of coils are disposed such that each coil excites a corresponding stator.

According to another aspect, the present invention which achieves at least one of these objectives relates to a stepper motor comprising a cylindrical rotor, a plurality of stators, and a plurality of coils. The cylindrical rotor is made of a permanent magnet which has been magnetized radially. The rotor has two rotor members which are disposed such that they oppose each other in an axial direction of the rotor. Each of the two rotor members has a plurality of magnetized layers which are formed in the axial direction of the rotor. Each of the magnetized layers has at least two magnetized portions, and the magnetized portions of adjacent magnetized layers have opposite polarities. Each of the stators has a plurality of magnetic pole portions which are disposed such that they oppose an outer periphery of the rotor. The plurality of magnetic pole portions of the plurality of stators are disposed such that they oppose the magnetized portions of the magnetized layers which are different in the axial direction of the rotor. The plurality of coils are disposed such that each coil excites a corresponding stator.

In this embodiment, one of the plurality of stators is disposed such that the magnetic pole portions thereof oppose one of the rotor members, while the other of the plurality of stators is disposed such that the magnetic pole portions thereof oppose the other of the rotor members. In addition, the motor can further comprise a permeable material disposed between the rotor members. The permeable material may be a rotor shaft which fixes the rotor members at two ends thereof. In addition, the two rotor members may be provided with a gap therebetween.

In this embodiment, the motor can further comprise a plurality of yokes made of a permeable material. The plurality of yokes can be disposed with respect to the plurality of stators in the axial direction of the rotor. The plurality of yokes can be disposed with respect to the rotor at a different position from that of the plurality of stators so that end portions of the plurality of yokes oppose different magnetized portions of the magnetized layers in the axial direction of the rotor from those which the plurality of stators oppose.

According to another aspect, the present invention which achieves at least one of these objectives relates to a stepper motor comprising a cylindrical rotor, a plurality of stators, a plurality of yokes, and a plurality of coils. The cylindrical rotor is made of a permanent magnet which has been magnetized radially. The rotor has two rotor members which are disposed in opposed relation in an axial direction thereof. One of the two rotor members has magnetized portions which are shifted from magnetized portions of the other rotor member by a predetermined angle. Each of the stators has a plurality of magnetic pole portions which are disposed such that they oppose an outer periphery of the rotor. The magnetic pole portions of the plurality of stators are disposed such that they oppose one of the rotor members of the rotor. The plurality of yokes are made of a permeable material. The plurality of yokes are disposed in the axial direction of the rotor with respect to the stators. The end portions of the yokes are disposed such that they oppose the other rotor member of the rotor. The plurality of coils are disposed such that each coil excites a corresponding stator.

According to still another aspect, the present invention which achieves at least one of these objectives relates to a stepper motor comprising a cylindrical rotor, a plurality of stators, and a plurality of coils. The cylindrical rotor is made of a permanent magnet which has been magnetized radially. The rotor has a plurality of magnetized layers formed in an axial direction thereof. Each of the magnetized layers has at least two magnetized portions. The magnetized portions of adjacent magnetized layers have opposite polarities. Each of the stators has a plurality of magnetic pole portions which are disposed such that they oppose an outer periphery of the rotor. The plurality of magnetic pole portions of the plurality of stators oppose the magnetized portions of the magnetized layers which are different in the axial direction of the rotor. The plurality of coils are disposed such that each coil excites a corresponding stator.

In this embodiment, the motor further comprises a ring-shaped base plate comprising a lens barrel. The rotor and the plurality of stators with the plurality of coils are provided on the base plate.

According to still another aspect, the present invention which achieves at least one of these objectives relates to a stepper motor for use in a lens driving device. The motor comprises a lens frame, a guide shaft provided on the lens frame, a cylindrical rotor, a ring-shaped base plate, and a plurality of stators, and a coil. The guide shaft has an externally threaded portion and a guide portion which are formed coaxially. The rotor is made of a permanent magnet which has been magnetized radially. The rotor has on an inner peripheral portion thereof an internally threaded portion which engages the externally threaded portion of the guide shaft. The rotor has a plurality of magnetized layers which are formed in an axial direction of the rotor. The ring-shaped base plate has a guide which is fitted with the guide portion of the guide shaft in order to slidably support the guide shaft in the axial direction. Each of the stators has a plurality of magnetic pole portions which oppose an outer periphery of the rotor. The plurality of stators are disposed on the ring-shaped base plate. The coil is wound around each of the stators so as to excite each of the stators.

In this embodiment, each of said magnetized portions of the rotor has at least two magnetized portions. The magnetized portions of adjacent magnetized layers have opposite polarities. The plurality of magnetic pole portions of the plurality of stators oppose the magnetized portions of the magnetized layers which are different in the axial direction of the rotor.

Other objects and advantages of the invention will become apparent from the following description taken in connection with the accompanying drawings.

DETAILED DESCRIPTION OF THE PREFERRED EMBODIMENTS

Embodiments of the present invention will now be described with reference to the accompanying drawings.

First Embodiment

Figure 1:
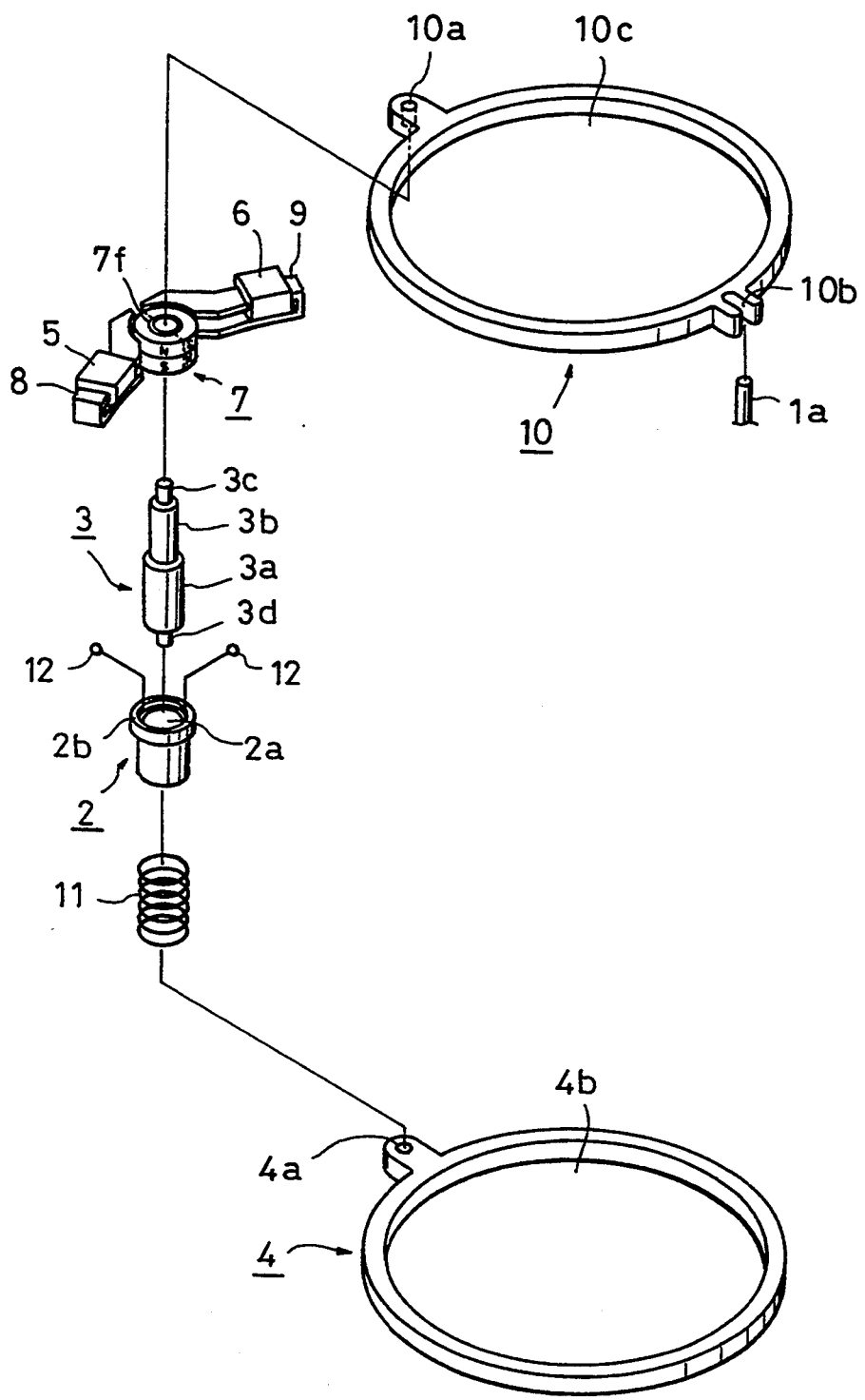
FIG. 1 is an exploded perspective view of a lens driving device employing a first embodiment of a stepper motor according to the present invention.
Figure 2:
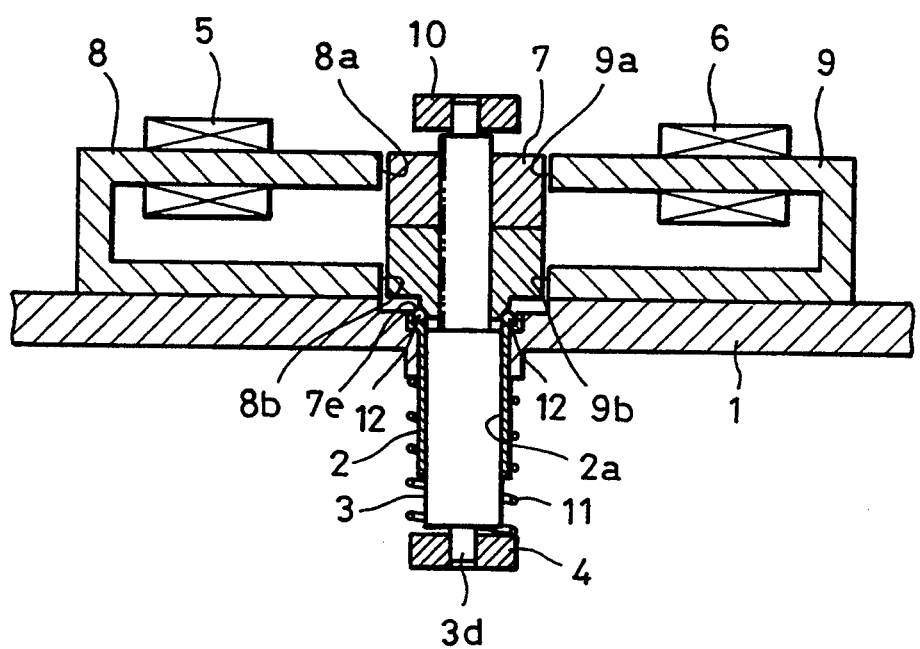
FIG. 2 is a cross-sectional view of the lens driving device shown in FIG. 1.
Figure 3:
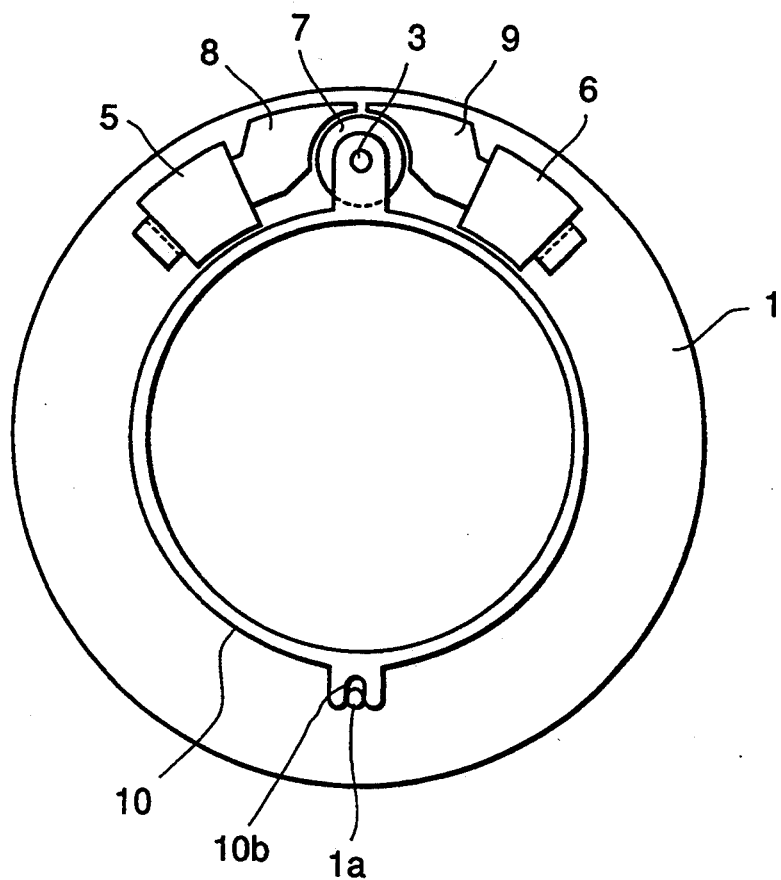
FIG. 3 is a plan view of the lens driving device shown in FIG. 1.
Figure 4:
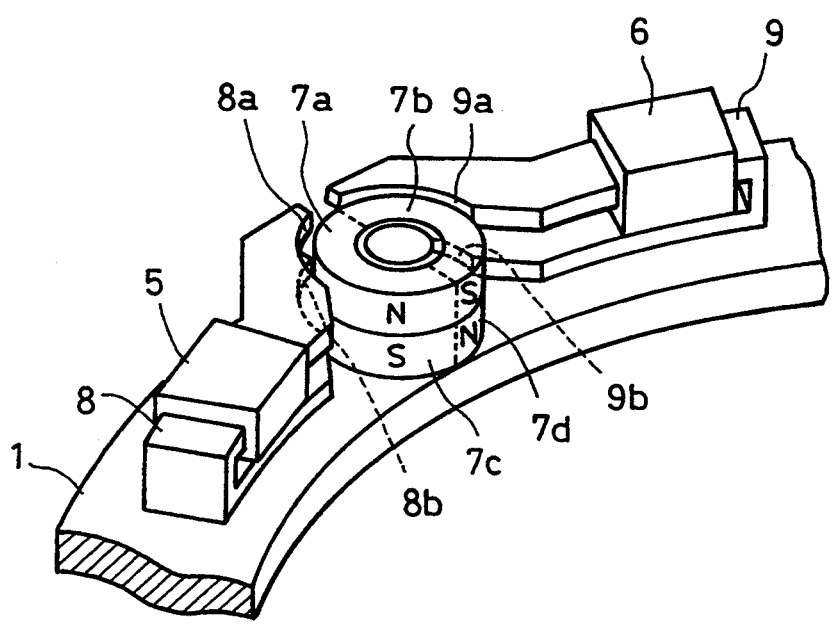
FIG. 4 is a perspective view illustrating the stepper motor shown in FIG. 1 in detail.

In FIGS. 1 through 12 which show a first embodiment of a lens driving device according to the present invention, FIG. 1 is an exploded perspective view of the major components of the lens driving device, FIG. 2 is a cross-sectional view of the lens driving device, FIG. 3 is a plan view thereof, and FIG. 4 is a perspective view of a stepper motor portion of the lens driving device.

Referring first to FIGS. 1 through 3, a lens driving device includes a base plate 1, a guide pipe 2 formed integrally with or fixed to the base plate 1, and a guide shaft 3 having an engaging portion 3a which slidably engages a through-hole 2a in the guide pipe 2 as well as an externally threaded portion 3b which meshes with an internally threaded portion of a rotor 7 which will be described later.

A second lens frame 4 has an inner diameter portion 4b within which a lens (not shown) is retained, and a hole 4a by means of which the second lens frame 4 is fixed to a lower end portion 3d of the guide shaft 3.

The rotor 7 has, on an outer peripheral portion, a permanent magnet portion which has been magnetized radially, and, in an inner diameter portion thereof, an internally threaded portion 7f which meshes with the externally threaded portion 3b of the guide shaft 3.

As shown in FIG. 4, the permanent magnet portion has been magnetized such that it has two parts in the circumferential direction thereof. Also, the permanent magnet portion is divided into two magnetized layers in the axial direction thereof. The magnetized portions located adjacent to each other in the circumferential direction, e.g., magnetized portions 7a and 7b, have opposite polarities. Also, the adjacent magnetized portions of the upper and lower magnetized layers, e.g., magnetized portions 7a and 7c, have opposite polarities. In other words, the magnetized portion 7a has a north pole, while the magnetized portion 7b has a south pole. The portion 7c has a south magnetic pole, while the portion 7d has a north magnetic pole.

A first stator portion 8 has magnetic pole portions 8a and 8b, and is fixed to the barrel base plate 1. A second stator portion 9 has magnetic pole portions 9a and 9b, and is fixed to the barrel base plate 1. Coils 5 and 6 are used to magnetize the first and second stator portions 8 and 9, respectively. The coils 5 and 6 are disposed on the outer side of a front group barrel, which will be described later, in the form of an arc, as shown in FIG. 3.

In the first and second stator portions 8 and 9, the magnetic pole portions 8a, 8b and 9a, 9b are aligned in the axial direction of the rotor 7. The magnetic pole portions 8a and 9a face a cylindrical portion of the rotor (the upper magnetized layer) which consists of the portions 7a and 7b. The magnetic pole portions 8b and 9b oppose a cylindrical portion of the rotor (the lower magnetized layer) which consists of the portions 7c and 7d.

Since the magnetic pole portions 8a, 8b and 9a, 9b are aligned in the axial direction of the rotor, a dimension A indicated by a bi-directional arrow (see FIG. 5) and required for the stepper motor including the motor 7 and the first and second stators 8 and 9, i.e., the radial dimension of the barrel base plate 1, can be reduced. This reduces the size of the lens barrel portion of a camera.

Turning to FIGS. 1 through 3 again, a front group barrel 10 retains a lens (not shown) in an inner diameter portion 10c thereof. A small-diameter upper end portion 3c of the guide shaft 3 is fitted into and fixed to the material surrounding a hole 10a (FIG. 1) formed in the front group barrel 10, whereby the front group barrel 10 is retained by the guide shaft 3. An elongated guide 10b formed on the outer periphery of the front group barrel 10 engages with a nib 1a of the base plate 1, whereby the front group barrel 10 is guided in such a manner as to be slidable along the optical axis. Thus, the guide shaft 3 is movable only along the optical axis and the rotation thereof is inhibited.

The rear group barrel 4 has the inner diameter portion 4b in which a lens (not shown) is retained. The lower end portion 3d of the guide shaft 3 is fitted into and fixed to the material surrounding the hole 4a formed in the rear group barrel 4, whereby the rear group barrel 4 is retained by the guide shaft 3. The lens (not shown) retained by the front group barrel 4 and the lens (not shown) retained by the rear group barrel 10 are disposed such that the optical axes thereof are aligned. Focusing is performed by moving the front and rear group barrels 10 and 4 together along the optical axis of the lens.

A compression spring 11 is disposed between the rear group barrel 4 and the base plate 1 to urge the rear group barrel 4 downward. Since the rear group barrel 4 is fixed to the guide shaft 3 while the front group barrel 10 and the rotor 7 are fixed to the guide shaft 3, the rear group barrel 4, the guide shaft 3, the front group barrel 10 and the rotor 7 are together urged downward by the compression spring 11. Steel balls 12 (FIGS. 1 and 2) are gripped between a back facing portion 2b of the guide pipe 2 and a tapered portion 7e of the rotor 7 so as to reduce the load applied when the rotor 7 rotates.

As the rotor rotates, the guide shaft 3 whose externally threaded portion 3b meshes with the internally threaded portion 7f moves up or down depending on the direction of rotation of the rotor 7.

The operation of the lens driving device will be described below. First, the operation of the stepper motor which rotates the rotor will be described with reference to FIGS. 5 through 12 (see FIGS. 1 and 4, either).

Assuming that the rotor 7 is at an initial position (FIGS. 1 and 4), the coils 5 and 6 are energized such that the magnetic pole portions 8a and 8b of the first stator 8 have a south magnetic pole and a north magnetic pole, respectively, and that the magnetic pole portions 9a and 9b of the second stator 9 have a north magnetic pole and a south magnetic pole, respectively.

Figure 5:
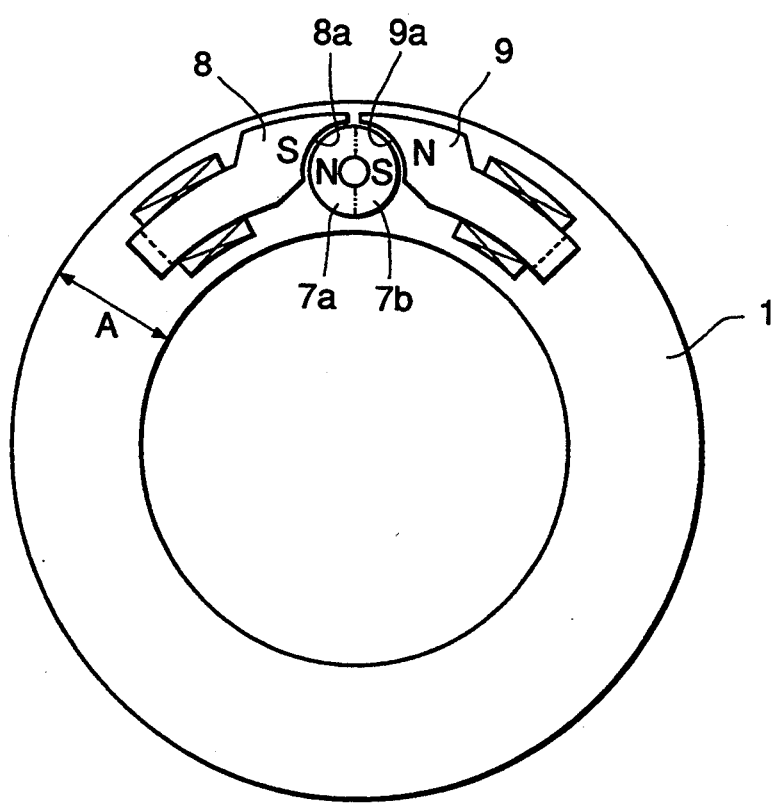
FIG. 5 is a plan view illustrating an upper rotor member and the magnetized state of stators in the stepper motor shown in FIG. 1.
Figure 6:
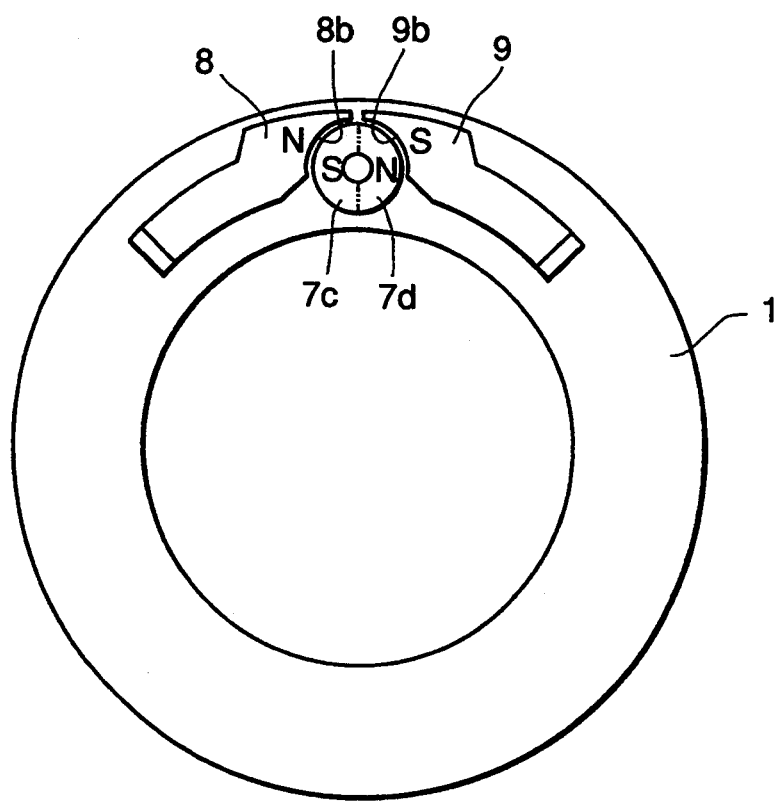
FIG. 6 is a plan view illustrating a lower rotor member and the magnetized state of the stators in the stepper motor shown in FIG. 5.

Consequently, the state shown in FIG. 5 is obtained regarding the upper layer of the rotor, and the state shown in FIG. 6 is obtained regarding the lower layer of the rotor. When the direction of energization of the coil 5 is switched over in that state such that the magnetic pole portions 8a and 8b of the first stator 8 have north and south magnetic poles, respectively, the magnetic pole portion 8a repels the portion 7a of the rotor 7 and attracts the portion 7b, while the magnetic pole portion 8b repels the portion 7c of the rotor 7 and attracts the portion 7d thereof, rotating the rotor counterclockwise by 90°, as shown in FIGS. 7 and 8.

Figure 7:
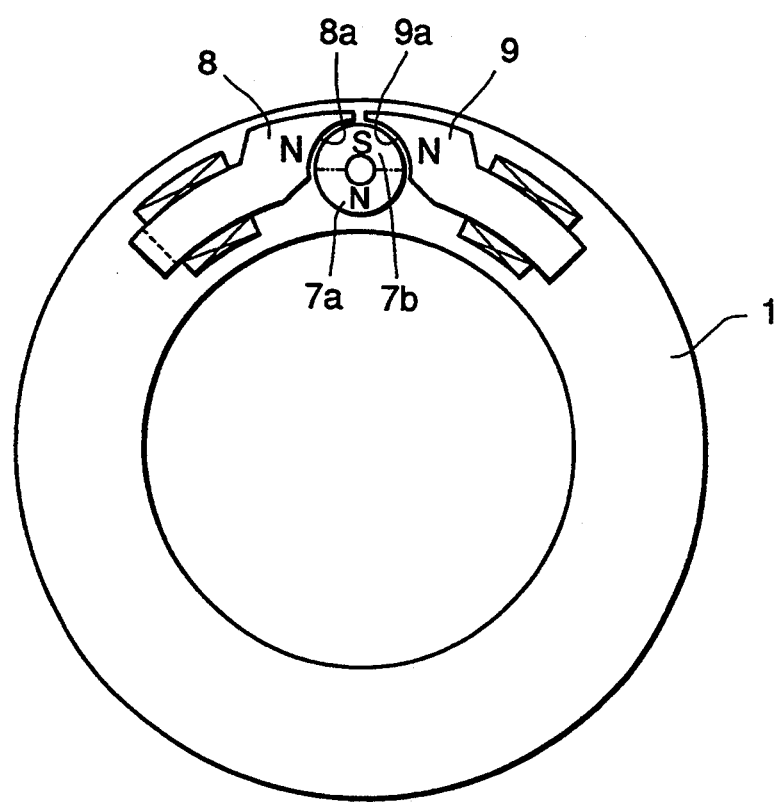
FIG. 7 is a plan view illustrating the upper rotor member and the magnetized state of the stators when the rotor of the stepper motor shown in FIG. 5 has rotated 90 degrees.
Figure 8:
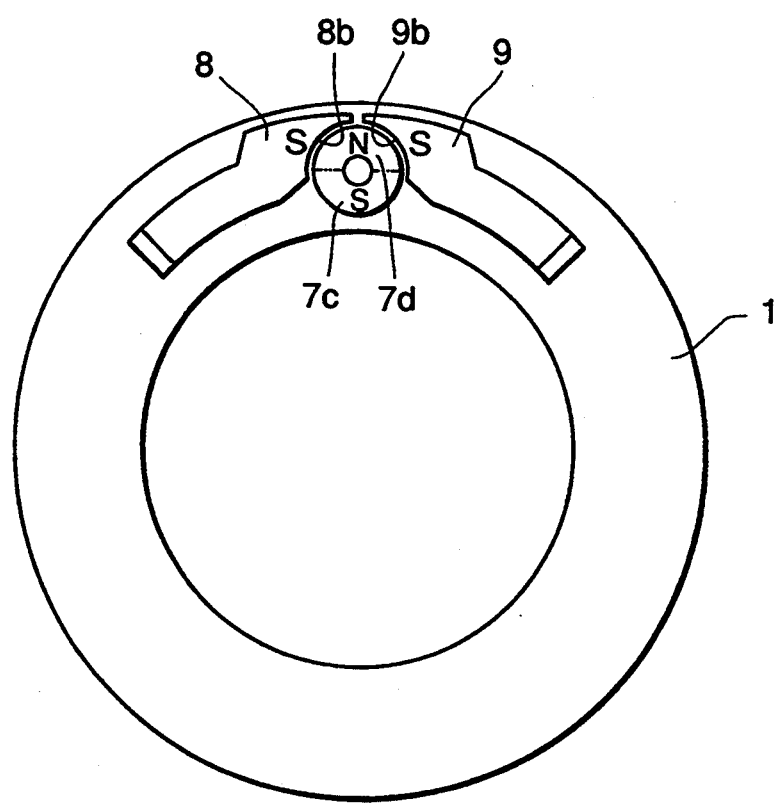
FIG. 8 is a plan view illustrating the lower rotor member and the magnetized state of the stators in the stepper motor shown in FIG. 7.
Figure 9:
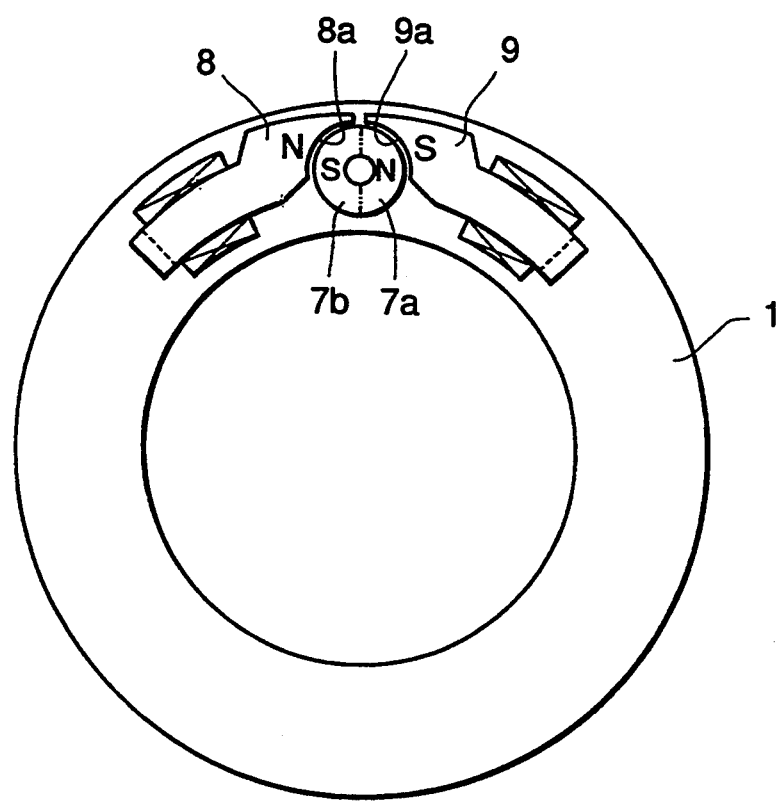
FIG. 9 is a plan view illustrating the upper rotor member and the magnetized state of the stators when the rotor of the stepper motor shown in FIG. 5 has rotated 180 degrees.
Figure 10:
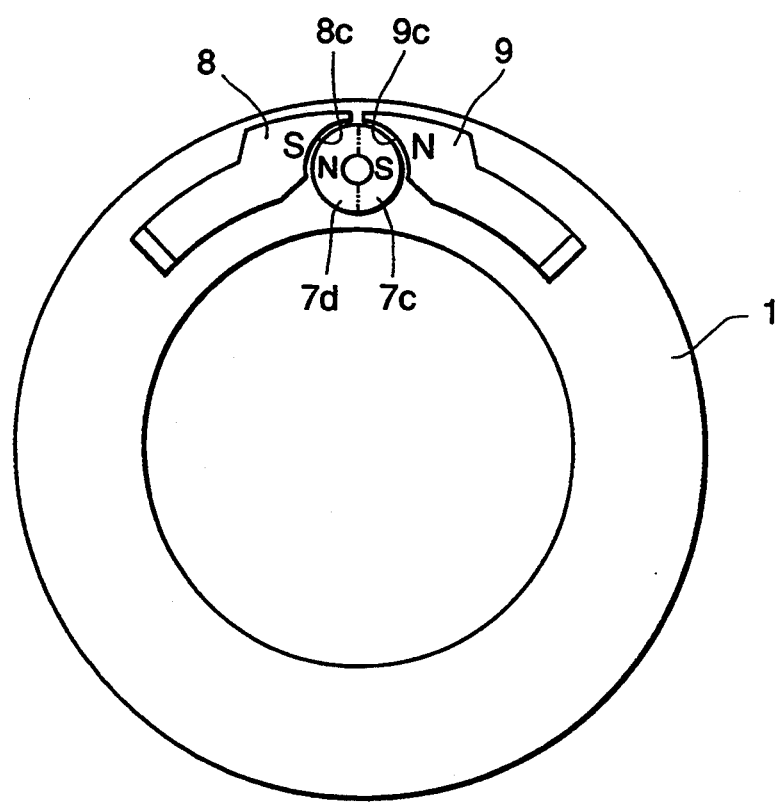
FIG. 10 is a plan view illustrating the lower rotor member and the magnetized state of the stators in the stepper motor shown in FIG. 9.

When the direction of energization of the coil 6 is switched over in that state such that the magnetic pole portions 9a and 9b of the second stator 9 have magnetic south and north poles, respectively, the magnetic pole portion 9a repels the portion 7b of the rotor 7 and attracts the portion 7a, while the magnetic pole portion 9b repels the portion 7d of the rotor 7 and attracts the portion 7c thereof, further rotating the rotor counterclockwise by 90° from the rotational position shown in FIGS. 7 and 8, as shown in FIGS. 9 and 10.

Figure 11:
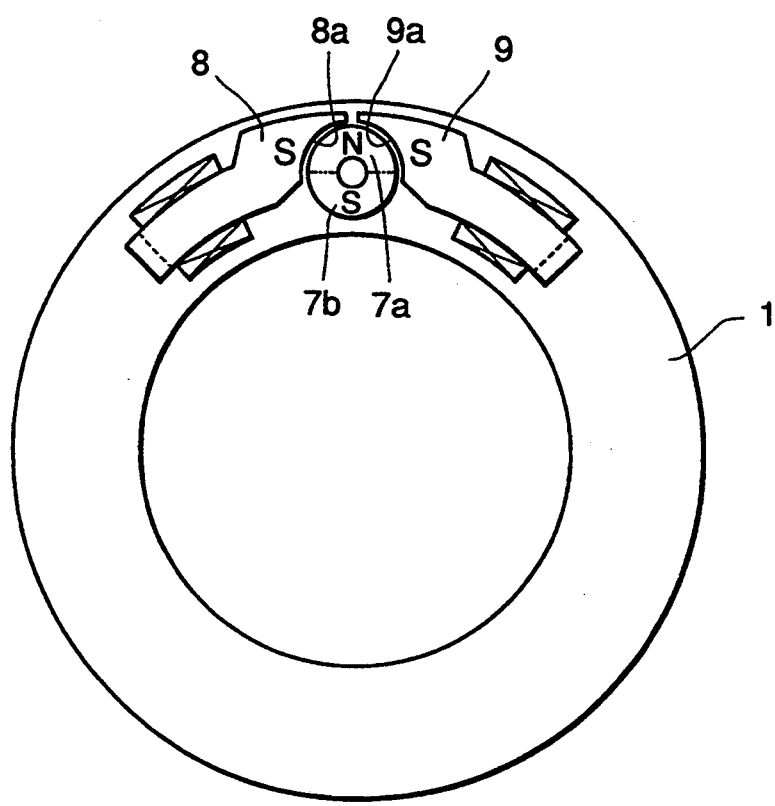
FIG. 11 is a plan view illustrating the upper rotor member and the magnetized state of the stators when the rotor of the stepper motor shown in FIG. 5 has rotated 270 degrees.
Figure 12:
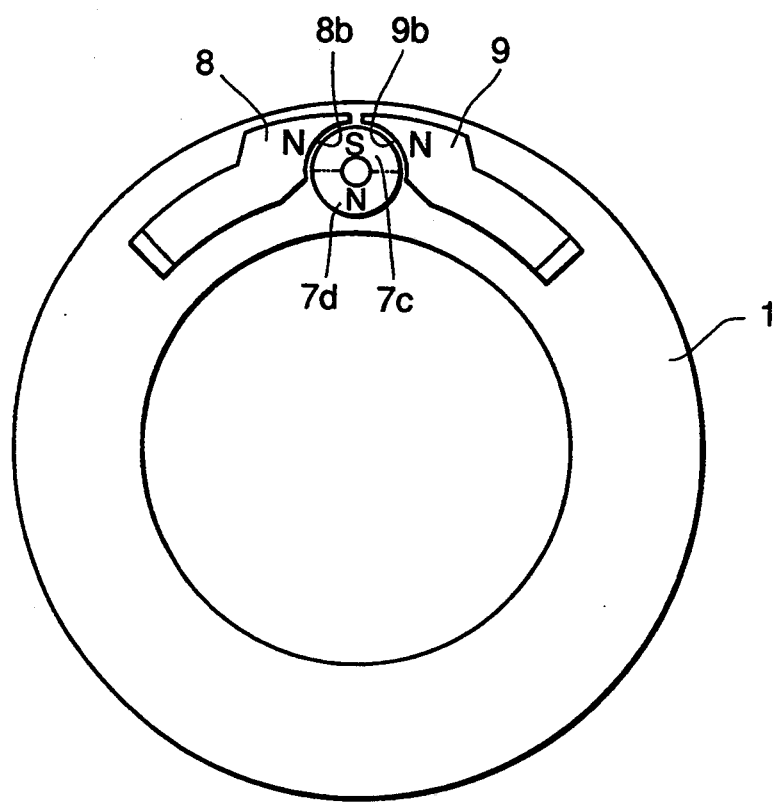
FIG. 12 is a plan view illustrating the lower rotor member and the magnetized state of the stators in the stepper motor shown in FIG. 11.

When the direction of energization of the coil 5 is switched over in that state such that the magnetic pole portions 8a and 8b of the first stator 8 have south and north magnetic poles, respectively, the magnetic pole portion 8a repels the portion 7b of the rotor 7 and attracts the portion 7a, while the magnetic pole portion 8b repels the portion 7d of the rotor 7 and attracts the portion 7c thereof, further rotating the rotor counterclockwise by 90° from the rotational position shown in FIGS. 9 and 10, as shown in FIGS. 11 and 12.

When the direction of energization of the coil 6 is switched over in that state such that the magnetic pole portions 9a and 9b of the second stator 9 have magnetic north and south poles, respectively, the magnetic pole portion 9a repels the portion 7a of the rotor 7 and attracts the portion 7b, while the magnetic pole portion 9b repels the portion 7c of the rotor 7 and attracts the portion 7d thereof, further rotating the rotor counterclockwise by 90° from the rotational position shown in FIGS. 11 and 12, as shown in FIGS. 5 and 6.

Consequently, the rotor 7 has made one revolution in the counterclockwise direction. The rotor 7 is rotated clockwise by sequentially switching over the direction of energization of the coils 5 and 6 similarly in the manner described below.

When the direction of energization of the coil 6 is switched over in the states shown in FIGS. 5 and 6 such that the magnetic pole portions 9a and 9b of the second stator 9 have south and north magnetic poles, respectively, the rotor 7 rotates clockwise by 90°, as shown in FIGS. 11 and 12. When the direction of energization of the coil 5 is switched over in the states shown in FIGS. 11 and 12 such that the magnetic pole portions 8a and 8b of the second stator 8 have north and south magnetic poles, respectively, the rotor 7 further rotates clockwise by 90°, as shown in FIGS. 9 and 10. When the direction of energization of the coil 6 is switched over in the states shown in FIGS. 9 and 10 such that the magnetic pole portions 9a and 9b of the second stator 9 have north and south magnetic poles, respectively, the rotor 7 further rotates clockwise by 90°, as shown in FIGS. 7 and 8. When the direction of energization of the coil 5 is switched over in the states shown in FIGS. 7 and 8 such that the magnetic pole portions 8a and 8b of the second stator 8 have south and north magnetic poles, respectively, the rotor 7 further rotates clockwise by 90°, as shown in FIGS. 5 and 6.

In this embodiment, the rotor has one south pole and one north pole which divide the rotor into two portions in the circumferential direction by 180°. However, a rotor which is divided into four or eight portions in the circumferential direction may also be employed. The present invention is not limited by the number of portions into which the rotor is divided.

Turning back to FIGS. 1 through 3, the lens driving device is operated in the manner described below. As the rotor 7 of the stepper motor is rotated in the manner described below, the guide shaft 3, the front group barrel 10 and the rear group barrel 4 move along the optical axis, i.e., in the upward or downward direction as viewed in FIG. 1, against the force of the spring 11 due to the mesh of the externally threaded portion 3b of the guide shaft 3 with the internally threaded portion 7f of the rotor 7. Since the guide shaft 3 is fitted into the guide pipe 2, the front and rear group barrels 10 and 4 are guided along the optical axis. Also, since the force of driving the front and rear barrels 10 and 4 along the optical axis is applied to the guide shaft 3, an excessive force is not applied to the front and rear group barrels 10 and 4. Consequently, inclination or deflection of these barrels 10 and 4 is prevented, and the driving load is reduced.

Furthermore, since the guide portion and the externally threaded portion 3b of the guide shaft 3 are provided along the optical axis, the width of the guide shaft 3, as viewed from above in FIG. 3, can be reduced, thus making provision of a compact camera possible. Furthermore, since the rotor of a motor is used as a rotational driving member having the internally threaded portion 7f which meshes with the externally threaded portion 3b of the guided shaft 3, a compact camera can be provided. Furthermore, since there is a smaller transmission loss in this embodiment as compared with a structure in which a driving force is transmitted from an actuator, such as another motor, using a gear or the like, to the rotational driving member, the driving force required for driving can be reduced.

Second Embodiment

Figure 13:
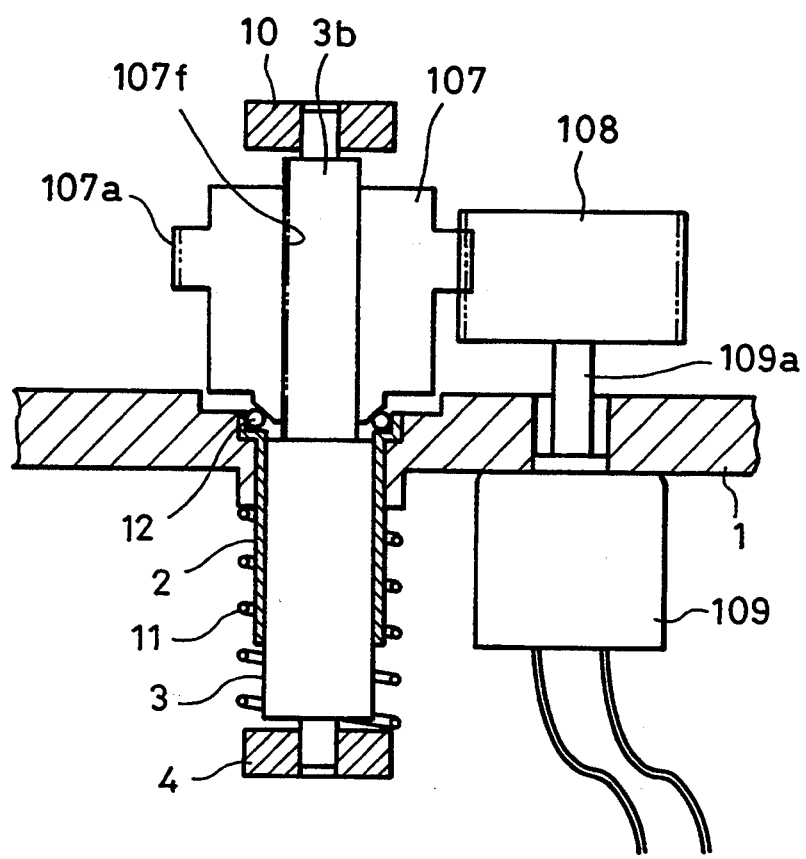
FIG. 13 is a cross-sectional view of a lens driving device which employs a second embodiment of the stepper motor according to the present invention.

FIG. 13 is a cross-sectional view of a second embodiment of the lens driving device according to the present invention. In this embodiment, reference numerals that are the same as the reference numerals shown in FIGS. 1-12 signify the same elements. In FIG. 13, a driving gear 107 is a rotational driving member which performs rotational motion in order to move the guide shaft 3 up or down. The driving gear 107 has an internally threaded portion 107f which meshes with the externally threaded portion 3b of the guide shaft 3 in an inner portion thereof. Also, the driving gear 107 has a gear portion 107a on an outer peripheral portion thereof. A pinion gear 108 meshes with the gear portion 107a of the driving gear 107. A motor 109 is fixed to the base plate 1. The pinion gear 108 is fixed to an output shaft of the motor 109. As the output shaft of the motor 109 is rotated by driving the motor 109, the pinion gear 108 rotates, and the rotational force, i.e., the driving force thereof, is transmitted to the driving gear 107, rotating the driving gear 107. The front and rear group barrels 10 and 4 are driven upward or downward along the optical axis depending on the direction of rotation of the driving gear 107, as in the case of the first embodiment.

This embodiment is as advantageous as the first embodiment with the exception that part of the driving force transmitted by the meshing of the pinion gear 108 with the gear portion 107a of the driving gear 107 is lost according to the transmission efficiency. In other words, the provision of a compact lens driving device is enabled and inclination and deflection of a lens barrel can be prevented, as in the case of the first embodiment.

Third Embodiment

Figure 14:
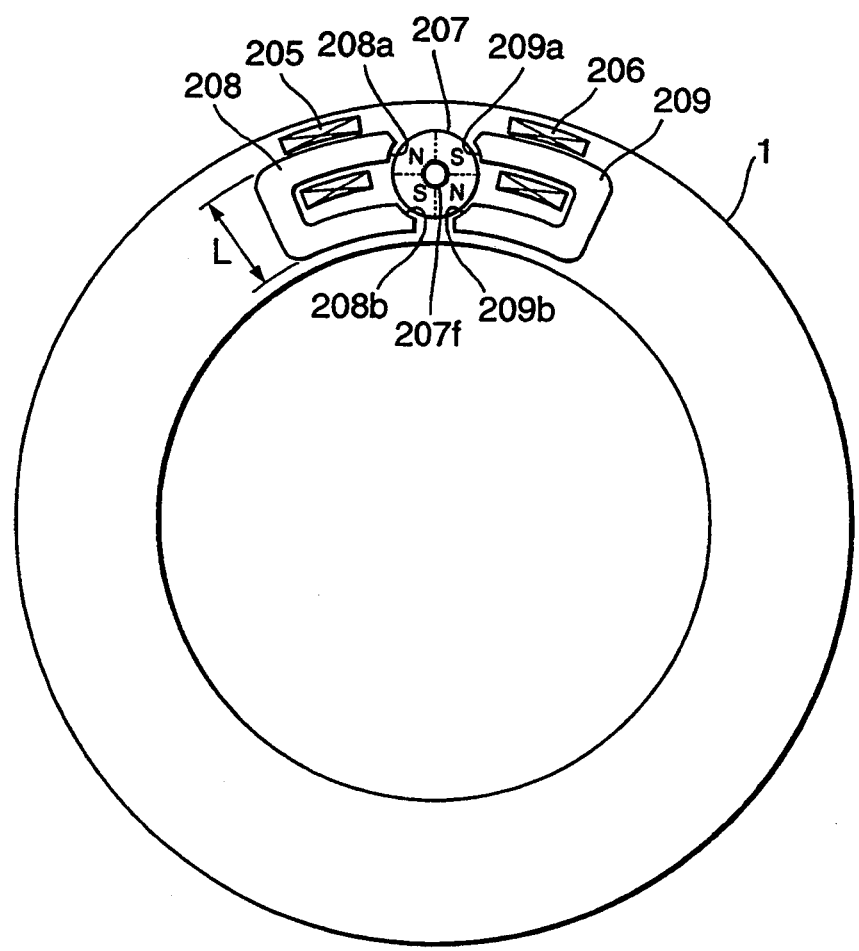
FIG. 14 is a plan view of a lens driving device which employs a third embodiment of the stepper motor according to the present invention.

FIG. 14 is a plan view of a third embodiment of the lens driving device according to the present invention. This embodiment differs from the first embodiment in the structure of the stepper motor.

Referring to FIG. 14, a rotor 207 includes a permanent magnet portion which has been magnetized in the circumferential direction in such a manner that it has south and north poles alternately, and an internally threaded portion 207f which engages an externally threaded portion of a guide shaft (not shown). Magnetic pole portions 208a, 208b and 209a, 209b of stators 208 and 209, respectively, are disposed such that they face the outer periphery of the rotor 207. Coils 205 and 206 are used to magnetize the stators 208 and 209, respectively.

In the thus-arranged stepper motor, the rotor 207 can be rotated by switching over energization of the coils 205 and 206 in the same manner as that of the first embodiment. On the guide shaft not shown) are mounted the front and rear group barrels, as in the case of the first embodiment. Consequently, rotation of the rotor moves the lens barrels along the optical axis, as in the case of the first embodiment. In the third embodiment, a dimension L of the stator in the radial direction is larger than that of the first embodiment. Thus, the lens driving device of the third embodiment may not be as compact as that of the first embodiment but is sufficiently compact as compared with a conventional device. The other advantages of this embodiment are the same as those of the first embodiment.

Fourth Embodiment

A fourth embodiment (and subsequent embodiments which will be described later) is intended to improve the structure of the stepper motor employed in the lens driving device of, for example, the first embodiment. The application of the stepper motor of this embodiment is not limited to the lens driving device which has been described in the first embodiment.

Figure 15:
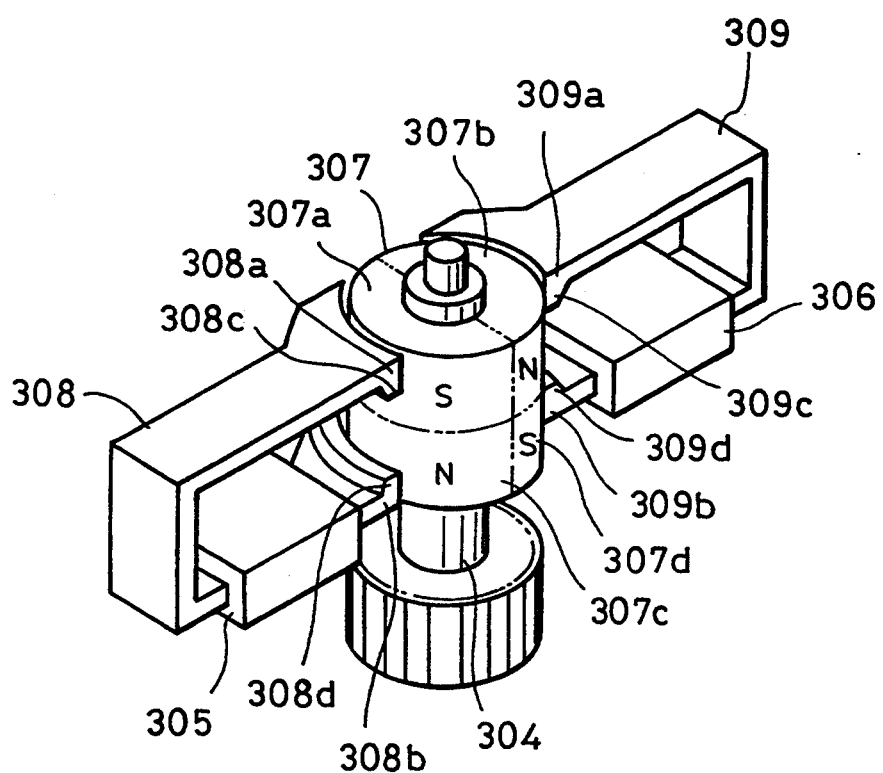
FIG. 15 is a perspective view of a fourth embodiment of the stepper motor according to the present invention.
Figure 16:
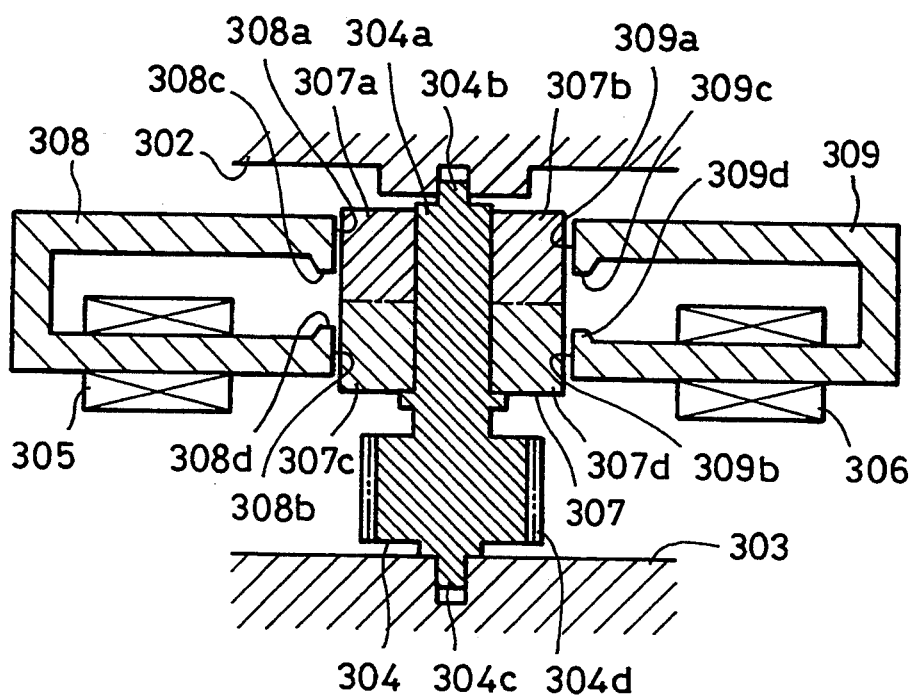
FIG. 16 is a cross-sectional view of the stepper motor shown in FIG. 15.

FIGS. 15 and 16 are respectively perspective and cross-sectional views of the stepper motor of the fourth embodiment. In FIGS. 15 and 16, a rotor 307 has, on an outer peripheral portion, a permanent magnet portion which has been magnetized in the radial direction. The permanent magnet portion has been magnetized such that it is divided into two parts in the circumferential direction thereof. Also, the permanent magnet portion is divided into two magnetized layers in the axial direction thereof. The magnetized portions located adjacent to each other in the circumferential direction, e.g., magnetized portions 307a and 307b, have opposite polarities. Also, the adjacent magnetized portions of the upper and lower magnetized layers, e.g., magnetized portions 307a and 307c, have opposite polarities. In other words, the magnetized portion 307a has a south pole, while the magnetized portion 307b has a north pole. The portion 307c has a north magnetic pole, while the portion 307d has a south magnetic pole.

A first stator portion 308 has magnetic pole portions 308a and 308b. A second stator portion 309 has magnetic pole portions 309a and 309b. As shown in FIGS. 15 and 16, the magnetic pole portions 308a and 308b of the stator 308, respectively, have protruding portions 308c and 308d, which protrude to narrow the gap between the magnetic pole portions 308a and 308b. Similarly, the magnetic pole portions 309a and 309b of the stator 309 respectively have protruding portions 309c and 309d, which protrude to narrow the gap between the magnetic pole portions 309a and 309b. More specifically, the protruding portions 308c, 308d, 309c and 309d are formed over the entire side of the magnetic pole portions 308a, 308b, 309a and 309b, respectively, at which the magnetic pole portions 308a, 308b, 309a and 309b face the rotor 307, i.e., over the entire width thereof, as viewed from above.

A rotor shaft 304, comprising a main body 304a, is a rotary shaft which is fixed to the cylindrical inner portion of the rotor 307 coaxially with respect to the rotor 307. The rotor shaft 304 is rotatably mounted on base plates 302 and 303 through portions 304b and 304c thereof. The rotor shaft 304 has a gear portion 304d, which is coupled to a lens barrel feeding mechanism (not shown) or a shutter driving mechanism (not shown) to drive the same. Coils 305 and 306 are used to magnetize the stators 308 and 309, respectively.

In the above-described structure, most of the magnetic flux generated by the stators as a consequence of energization of the coil 305 or the coil 306 passes in the vicinity of the area between the protruding portions 308c and 308d or between the protruding portions 309c and 309d where the air gap of the stators is narrow, and leakage of the magnetic flux, which would occur at a site separated from the magnetic poles of the rotor 307, can thus be prevented. Consequently, the magnetic flux can be made to act on the magnetized portions of the rotor 307 effectively, and the output level of the motor can thus be increased.

Fifth Embodiment

Figure 17:
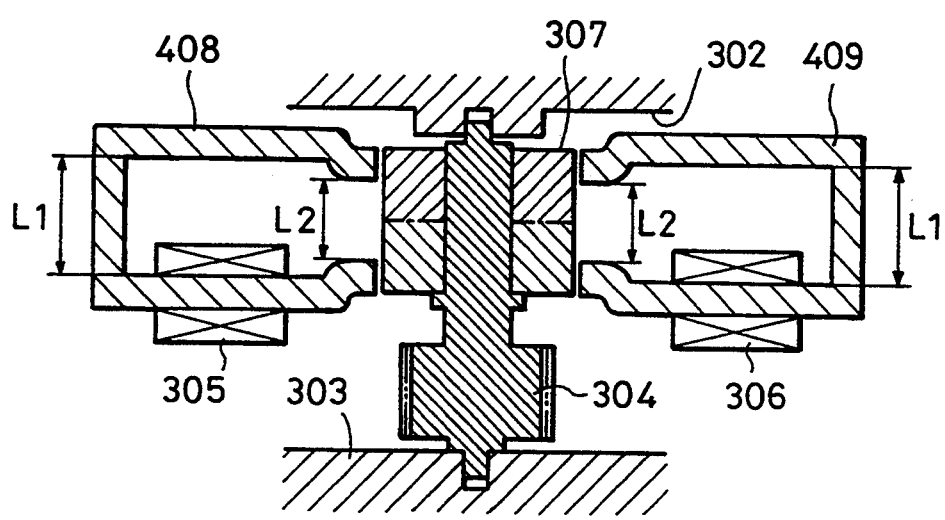
FIG. 17 is a cross-sectional view of a fifth embodiment of the stepper motor according to the present invention.

FIG. 17 is a cross-sectional view of a stepper motor employed in a fifth embodiment of the present invention. The structure of the stepper motor in the fifth embodiment is the same as that of the stepper motor employed in the fourth embodiment except for the shape of the stators. Therefore, the stator will be described below with description of the other portions being omitted. As shown in FIG. 17, stators 408 and 409 have a shape in which the gap between upper and lower magnetic pole portions is reduced from $L_1$ to $L_2$ ($L_1 > L_2$) near the position thereof which faces the rotor. Consequently, the magnetic flux generated as a consequence of energization of the coil 305 or the coil 306 passes near the portion of the stator 408 or the stator 409, respectively, where the gap of the upper and lower magnetic pole portions is reduced to $L_2$, as in the case of the fourth embodiment, and is thus made to readily act on the magnetic flux generated by the permanent magnet portion of the rotor 307, increasing the output level of the motor.

Sixth Embodiment

Figure 18:
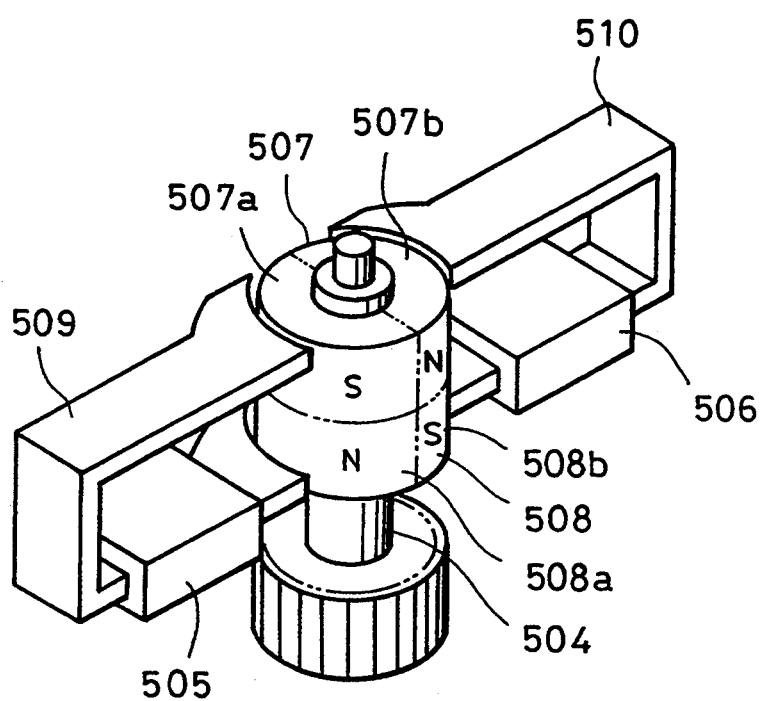
FIG. 18 is a perspective view of a sixth embodiment of the stepper motor according to the present invention.
Figure 19:
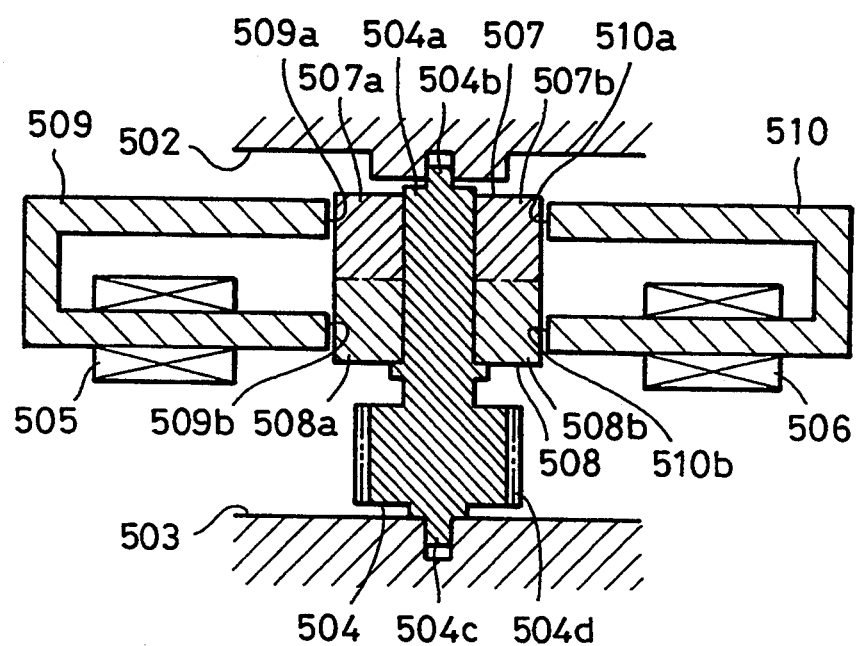
FIG. 19 is a cross-sectional view of the stepper motor shown in FIG. 18.

FIGS. 18 and 19 are perspective and cross-sectional views of a stepper motor employed in a sixth embodiment of the present invention. The stepper motor of this embodiment is of the same type as that employed in the first, fourth and fifth embodiments. In FIGS. 18 and 19, a first magnetized ring 507, which is a permanent magnet, has a magnetized portion 507a having a south pole, and a magnetized portion 507b having a north pole. A second magnetized ring 508, which is also a permanent magnet, has a magnetized portion 508a having a north pole, and a magnetized portion 508b having a south pole. A rotor shaft 504 is rotatably mounted on base plates 502 and 503 through portions 504b and 504c thereof, respectively. The first and second magnetized rings 507 and 508 are fixed to a portion 504a of the rotor shaft 504 such that the magnetized portions thereof located adjacent to each other in the vertical direction have different polarities. The rotor shaft 504 has a gear portion 504d, which is coupled to a lens barrel feeding mechanism (not shown) or a shutter driving mechanism (not shown) to drive the same.

Stator 509 comprises magnetic pole portions 509a and 509b, while stator 510 comprises magnetic pole portions 510a and 510b. The motor also comprises coil 505 surrounding the lower portion of stator 509 and coil 506 surrounding the lower portion of the stator 510. In such a stepper motor, a larger amount of magnetic flux is generated by the magnetic pole portions 509b and 510b located closer to the magnetic path of the coils 505 and 506 as a consequence of energization of the coils 505 and 506 than by the magnetic pole portions 509a and 510a located far from the coils 505 and 506 due to the leakage of the magnetic flux.

If the residual magnetic flux of the second magnetized ring 508 which opposes the magnetic pole portions 509b and 510b, located closer to the coils, is equal to the residual magnetic flux of the first magnetized ring 507 which opposes the magnetic pole portions 509a and 510a, located far from the coils, the residual magnetic flux of the second or first magnetized ring does not balance the magnetic flux generated by the corresponding magnetic pole portions as a consequence of energization of the coil, reducing the output level of the stepper motor. In order to increase the output level of the stepper motor, the magnetic flux generated by the permanent magnets must be substantially the same as the magnetic flux generated by the corresponding magnetic pole portions as a consequence of energization of the corresponding coils.

The first magnetized ring 507 is a permanent magnet which ensures that the magnetic flux generated by itself is smaller than that generated by the second magnetized ring 508. If the second magnetized ring 508 is, for example, a sintered magnet made of a rare earth element, the first magnetized ring 507 is a ferrite or plastic magnet.

In this embodiment, the magnetic pole portions 509a and 510a, which generate less magnetic flux as a consequence of energization of the coils 505 and 506, oppose the magnetized layer made of the permanent magnet which generates the smaller amount of magnetic flux, while the magnetic pole portions 509b and 510b, which generate a greater amount of magnetic flux as a consequence of their proximity to the coils, oppose the magnetized layer made of the permanent magnet which generates a greater amount of magnetic flux. In this way, the output level and efficiency of the stepper motor can be enhanced.

Seventh Embodiment

Figure 20:
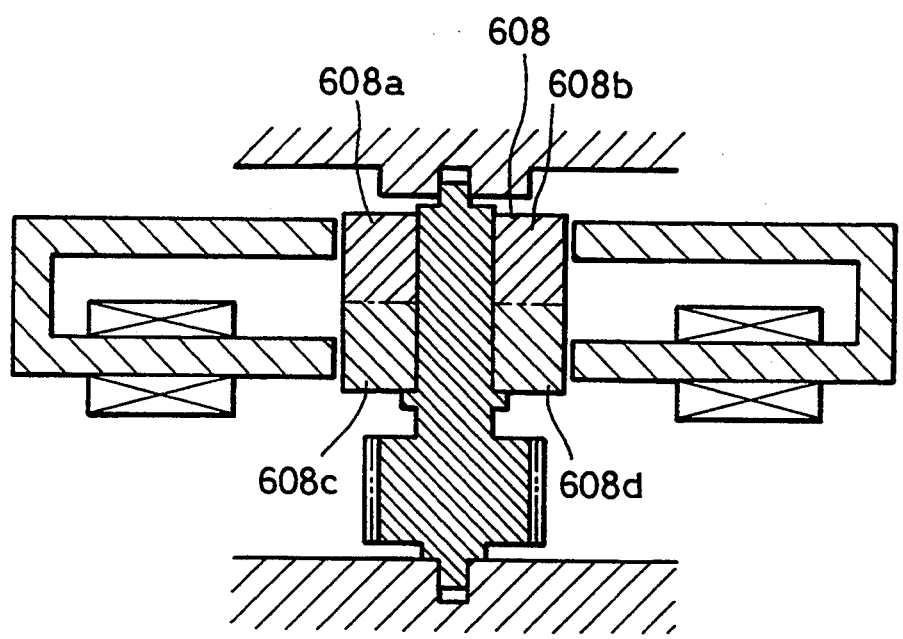
FIG. 20 is a cross-sectional view of a seventh embodiment of the stepper motor according to the present invention.

FIG. 20 is cross-sectional view of a stepper motor employed in a seventh embodiment of the present invention. The seventh embodiment is substantially the same as the sixth embodiment except for the structure of the permanent magnet. Therefore, the structure of the permanent magnet will be discussed below with the description of the other structure being omitted. In this embodiment, a plurality of magnetized layers of the rotor constitute a single permanent magnet 608. However, in the magnet 608, a magnetized layer consisting of magnetized portions 608a and 608b and a magnetized layer consisting of magnetized portions 608c and 608d have been magnetized at different magnetizing strengths. Therefore, although the two magnetized layers of the magnet are made of the same material, they have different residual magnetic fluxes. Consequently, the seventh embodiment offers the same advantages as those of the sixth embodiment.

Eight Embodiment

Figure 21:
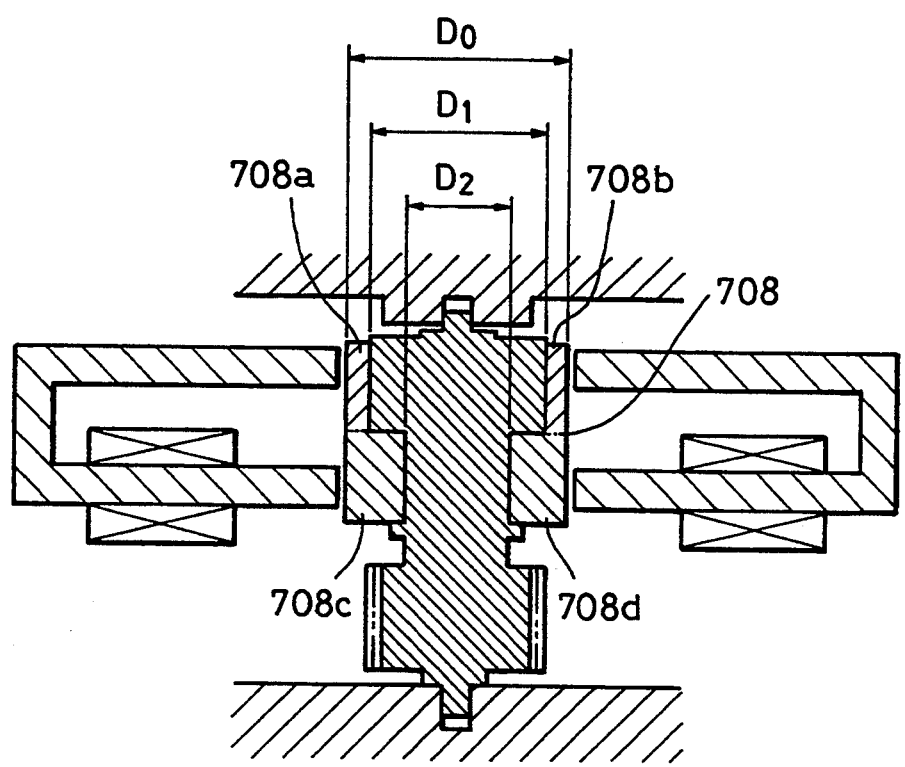
FIG. 21 is a cross-sectional view of an eighth embodiment of the stepper motor according to the present invention.

FIG. 21 is a cross-sectional view of a stepper motor employed in an eighth embodiment of the present invention. The eighth embodiment is substantially the same as the sixth embodiment except for the structure of the permanent magnet. Therefore, the structure of the permanent magnet will be discussed below with description of the other structure being omitted. In this embodiment, a plurality of magnetized layers of the rotor constitute a single permanent magnet 708. However, in the magnet 708, a first magnetized layer consisting of magnetized portions 708a and 708b and a second magnetized layer consisting of magnetized portions 708c and 708d are different in an inner diameter portion thereof. That is, the inner diameter $D_1$ of the first magnetized layer and the inner diameter $D_2$ of the second magnetized layer have a relation expressed by $D_1 > D_2$. Since the outer diameter $D_0$ of the first and second magnetized layers is the same, even when the first and second magnetized layers have been magnetized at the same strength, the second magnetized layer has a greater coefficient of permeance than the first magnetized layer due to the thickness relation between the first and second magnetized layers having a relation expressed by $(D_0-D_1)/2 < (D_0-D_2)/2$. Consequently, the magnetized flux $\Phi_2$ generated by the second magnetized layer and the magnetic flux $\Phi_1$ generated by the first magnetized layer satisfy a relation expressed by $\Phi_1 < \Phi_2$. This ensures the same advantages as those of the sixth embodiment.

Ninth Embodiment

Figure 22:
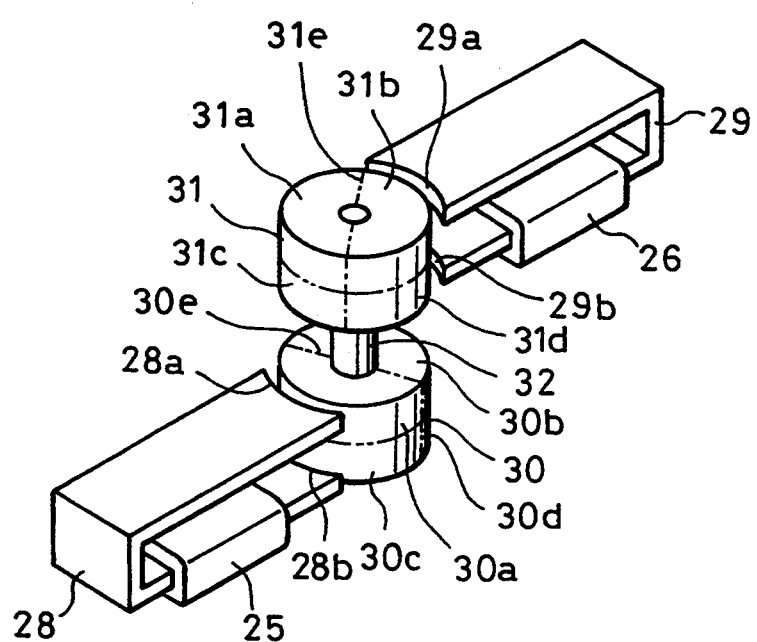
FIG. 22 is a perspective view of a ninth embodiment of the stepper motor according to the present invention.
Figure 23:
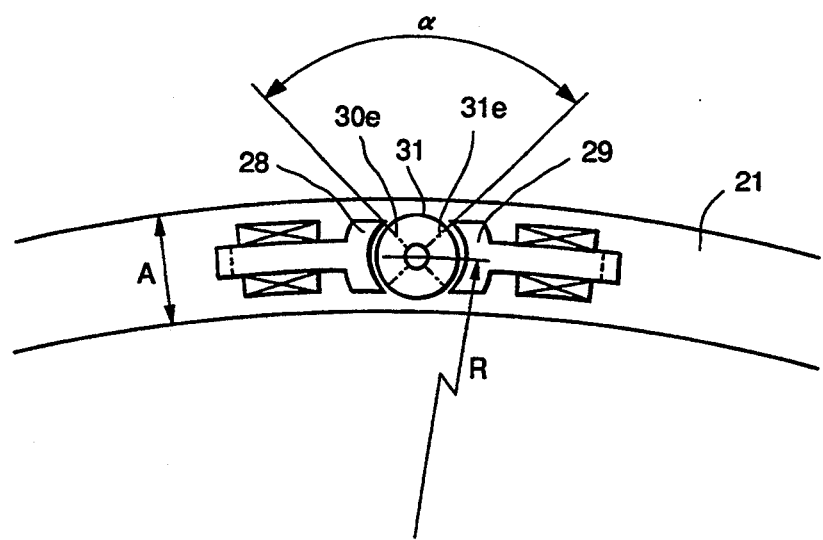
FIG. 23 is a cross-sectional view of the stepper motor shown in FIG. 22.

FIGS. 22 through 27 show a stepper motor employee in a ninth embodiment of the present invention. Referring first to FIG. 22, first and second rotor members 30 and 31 are fixed to two ends of a shaft 32 so that they can be rotated together. The rotors are used to open/close a shutter or drive a photographic lens, as in the case of the first embodiment.

The first rotor member 30 is made of a permanent magnet which includes upper and lower magnetized layers each having two magnetized portions. Thus, the first rotor member 30 has a total of four magnetized portions, wherein a magnetized portion 30a has a south magnetic pole, a magnetized portion 30b has a north pole, a magnetized portion 30c has a north pole and a magnetized portion 30d has a south pole. A second rotor 31 is also made of a permanent magnet which includes upper and lower magnetized layers each having two magnetized portions. Thus, like the first rotor member 30, the second rotor member 31 has a total of four magnetized portions, wherein a magnetized portion 31a has a south magnetic pole, a magnetized portion 31b has a north pole, a magnetized portion 31c has a north pole and a magnetized portion 31d has a south pole.

In this embodiment, the magnetized portions 30a, 30b and 30c, 30d of the first rotor member 30 extend over an angle of 180° in the circumferential direction, while the magnetized portions 31a, 31b and 31c, 31d of the second rotor member 31 extend over an angle of 180° in the circumferential direction, as shown in FIG. 22. The magnetized portions 30a and 30c of the first rotor member 30 are in phase in the rotational direction thereof, i.e., the magnetized portions 30a and 30c are aligned in the axial direction. Therefore, the magnetized portions 30b and 30d of the first rotor member 30 are in phase in the rotational direction thereof. The magnetized portions 31a and 31c of the second rotor member 31 are in phase in the rotational direction, while the magnetized portions 31b and 31d are in phase in the rotational direction.

However, the first and second rotor members 30 and 31 are out of phase in the rotational direction. That is, a boundary line 30e between the magnetized portions of the first rotor member 30 is shifted with respect to a boundary line 31e of the magnetized portions of the second rotor member 31 by a certain angle, e.g., by an angle of α (see FIG. 23).

Two magnetic pole portions 28a and 28b of a first stator 28 are disposed on a barrel base plate 21 in such a manner that they face the first rotor member 30. Two magnetic pole portions 29a and 29b of a second stator 29 are disposed on the barrel base plate 21 in such a manner that they face the second rotor member 31 (see FIG. 23). In each of the two stators 28 and 29, the center of the two magnetic pole portions is on a radius R located on a concentric circle of the barrel base plate 21 which passes through the center of rotation of the first and second rotor members (see FIG. 23). Where n is the number of portions into which the rotor member is divided for magnetization, an angle β formed between two adjacent boundary lines of the magnetized portions of the first and second rotor members is 180°/n. In this embodiment, since the rotor is divided into two parts, one south magnetic pole and one north magnetic pole, in the circumferential direction, β=90°.

A preferable α, which is the phase difference in magnetization between the first and second rotor members 30 and 31, is α=180°−180°/n. In this embodiment, since n=2, α=90°.

Figure 24:
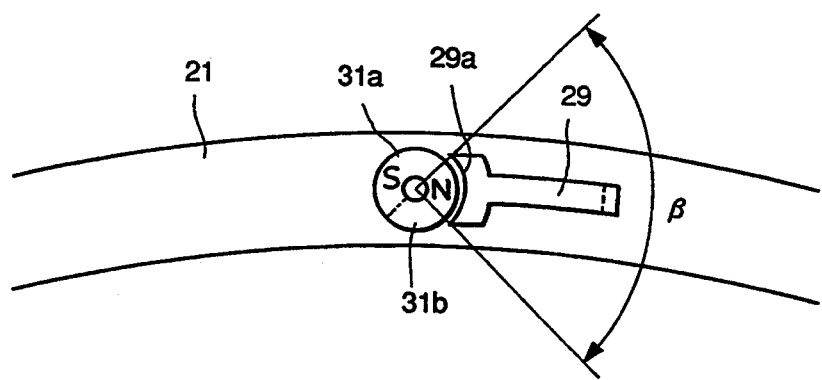
FIG. 24 is a plan view illustrating the relation between a second rotor member and one of the magnetic pole portions of a second stator in the stepper motor shown in FIG. 22.
Figure 25:
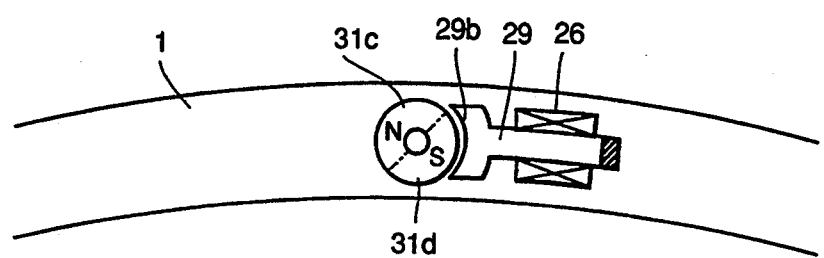
FIG. 25 is a plan view illustrating the relation between the second rotor member and the other magnetic pole portion of the second stator in the stepper motor shown in FIG. 22.
Figure 26:
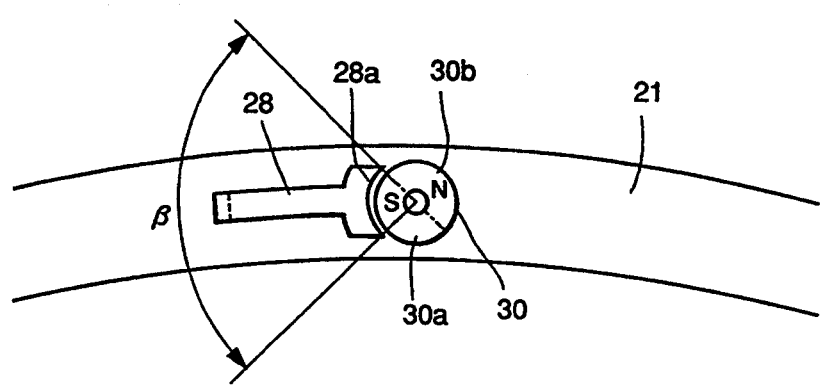
FIG. 26 is a plan view illustrating the relation between a first rotor member and one of the magnetic pole portions of a first stator in the stepper motor shown in FIG. 22.
Figure 27:
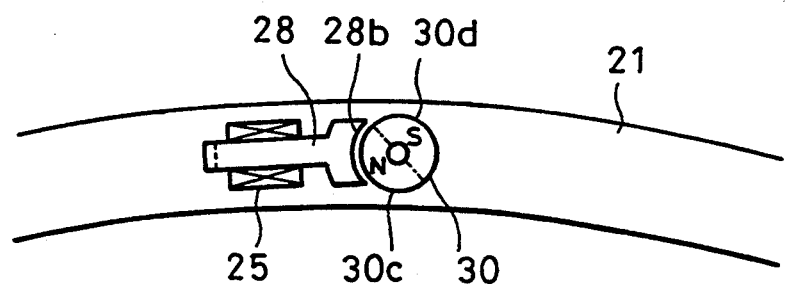
FIG. 27 is a plan view illustrating the relation between the first rotor member and the other magnetic pole portion of the first stator in the stepper motor shown in FIG. 22.

The positional relation between the magnetic pole portions 28a, 28b, 29a, 29b and the first and second rotor members 30 and 31, shown in FIG. 22, is shown in FIGS. 24 through 27. That is, FIG. 24 shows the layout between the second rotor member 31 and the magnetic pole portion 29a of the second stator. FIG. 25 shows the layout between the second rotor member 31 and the magnetic pole portion 29b of the second stator. FIG. 26 shows the layout between the first rotor member 30 and the magnetic pole portion 28a of the first stator. FIG. 27 shows the layout between the first rotor member 30 and the magnetic pole portion 28b of the first stator.

In the ninth embodiment, the rotors are driven by switching over the energization of coils 25 and 26, as in the case of the first embodiment, detailed description being omitted.

In the ninth embodiment, since the magnetic pole portions of the stator do not protrude outwardly or inwardly from the rotor with respect to the radial direction of the barrel base plate 21, the dimension A can be further reduced.

Tenth Embodiment

Figure 40:
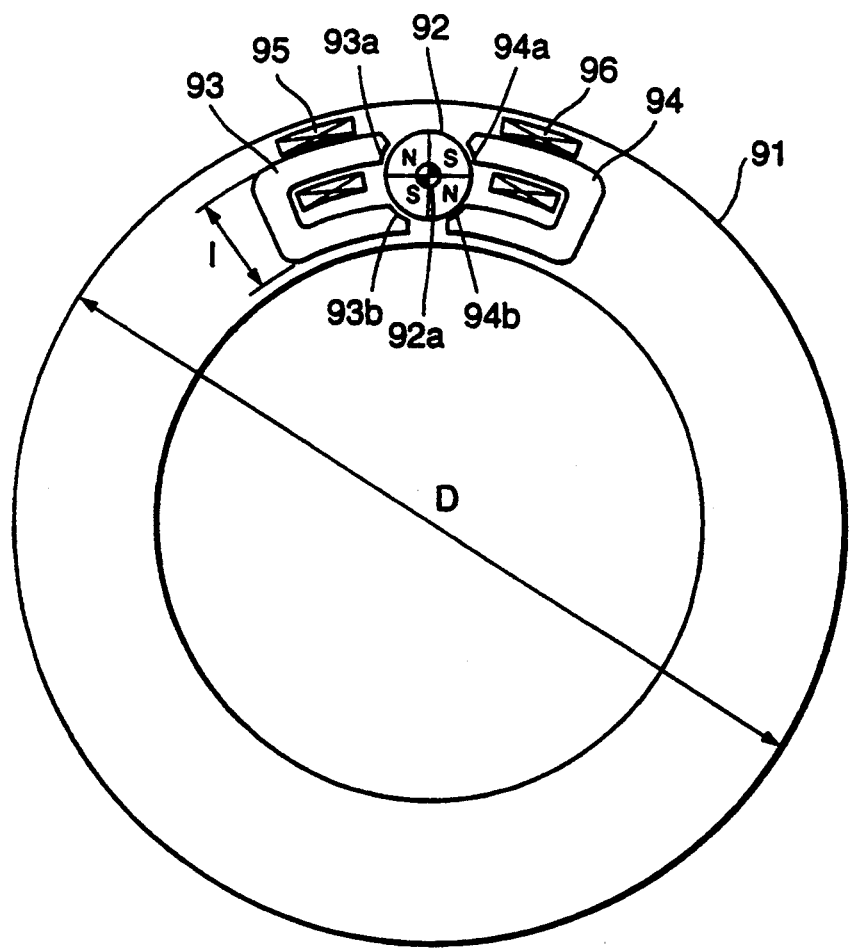
FIG. 40 is a plan view of a conventional stepper motor.
Figure 41:
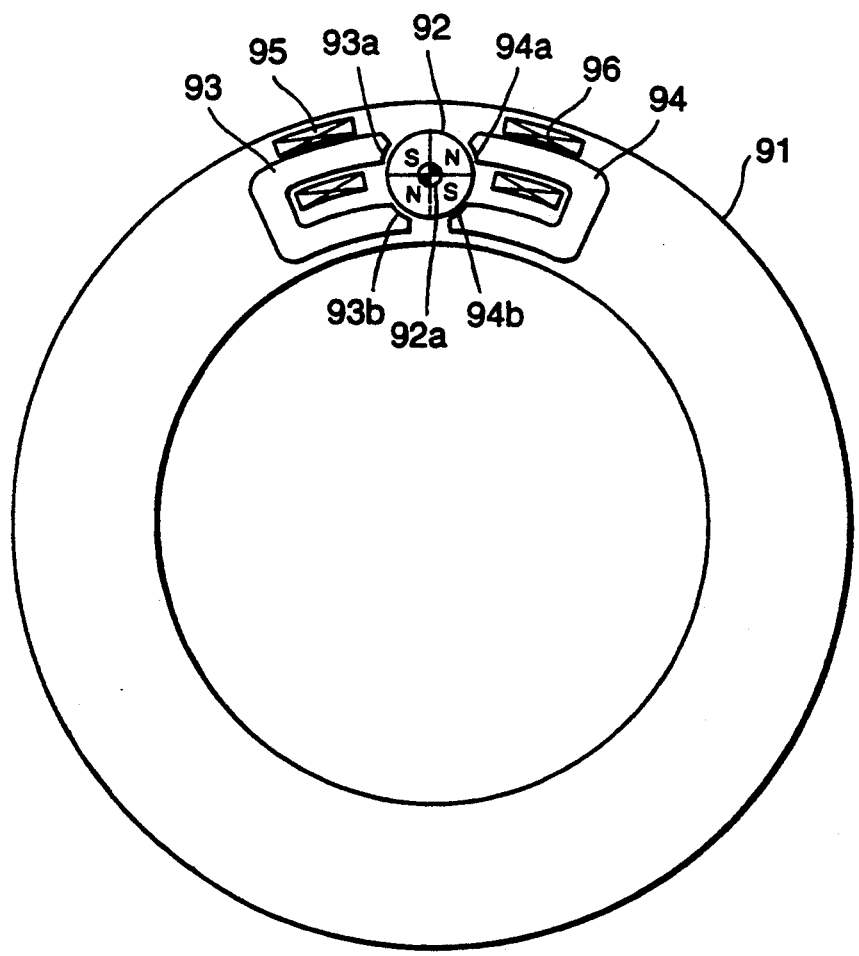
FIG. 41 is a plan view showing the state obtained when a rotor of the conventional stepper motor shown in FIG. 40 has rotated to a first position.
Figure 42:
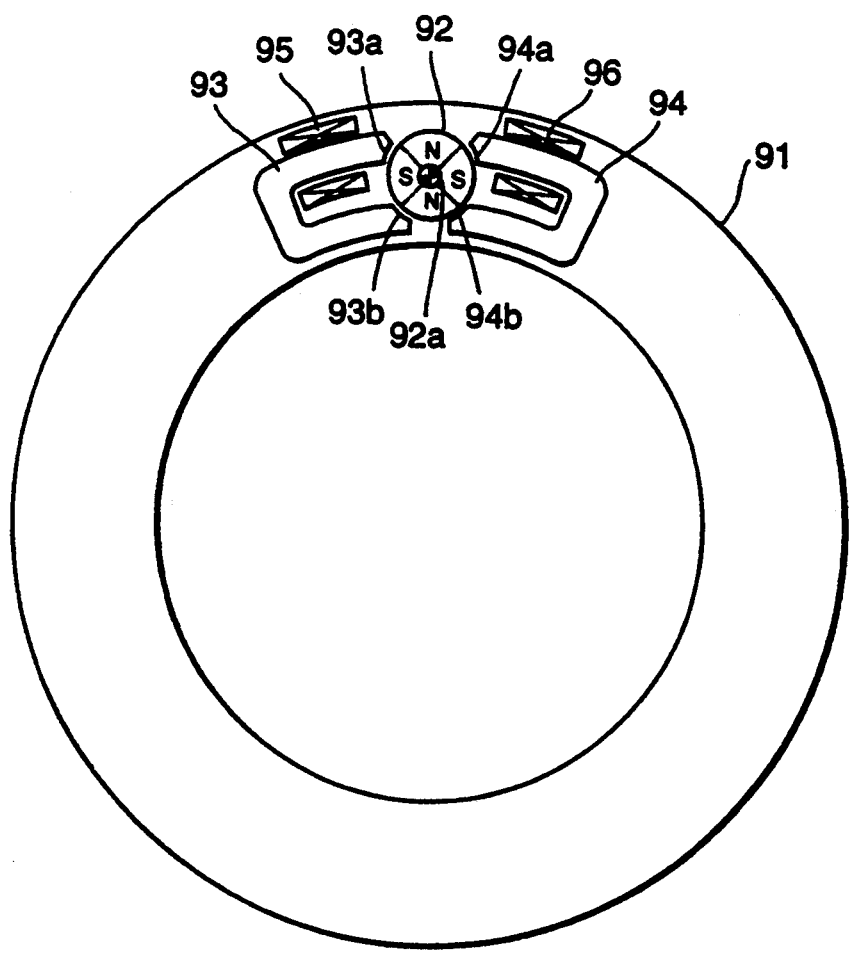
FIG. 42 is a plan view showing the state obtained when the rotor of the conventional stepper motor shown in FIG. 40 has rotated to a second position.
Figure 43:
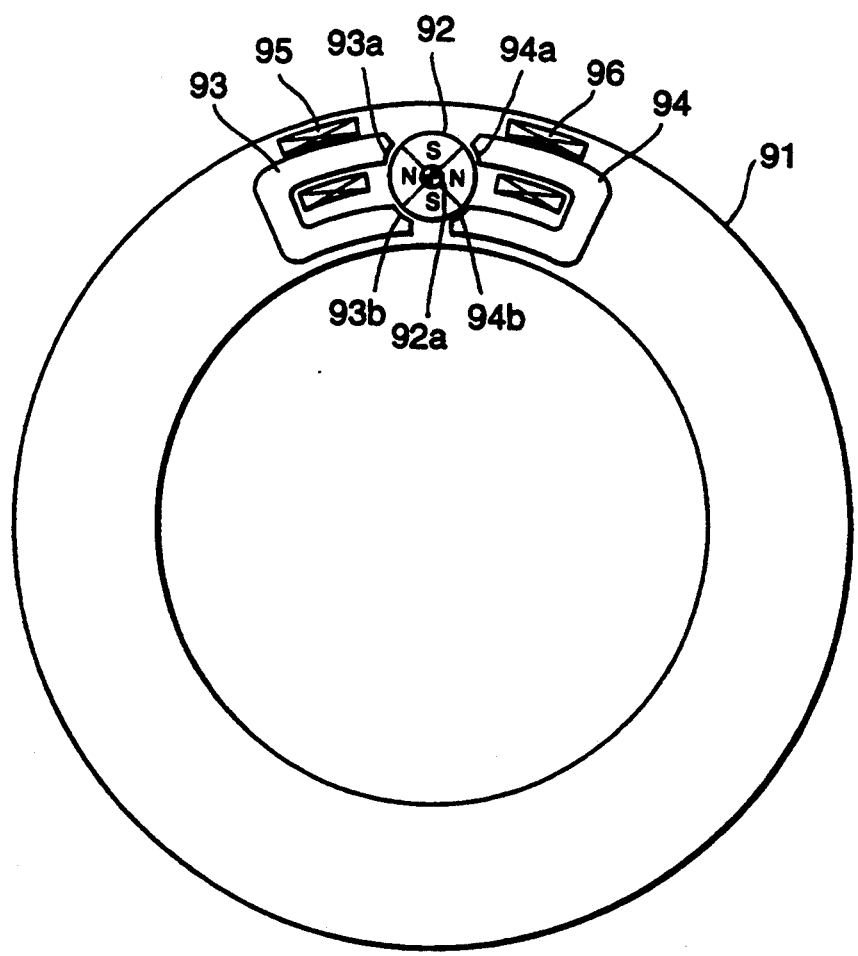
FIG. 43 is a plan view showing the state obtained when the rotor of the conventional stepper motor shown in FIG. 40 has rotated to a third position.

A tenth embodiment of the present invention is intended to improve the deficiency (a reduction in the generation of a driving torque) resulting from structural alteration of the stepper motor to reduce the dimension of the barrel base plate in the radial direction in the first embodiment, while maintaining that dimension small. In other words, in the stepper motor employed in the first embodiment of the present invention (see FIG. 1), since the rotor thereof has been magnetized in the radial direction, most of the magnetic flux in the rotor 7 is directed from the magnetized portion 7b to the magnetized portion 7a and from the magnetized portion 7c to the magnetized portion 7d. Consequently, a magnetic circuit, which passes along the magnetic pole portion 9a of the stator 9→the magnetized portion 7b of the rotor 7→the magnetized portion 7a→the magnetic pole portion 8a of the stator 8→the magnetic pole portion 8b→the magnetized portion 7c of the rotor 7, the magnetized portion 7d→the magnetic pole portion 9b of the stator 9→(the magnetic pole portion 9a), is formed. The formed magnetic circuit has a deficiency in that the driving torque equivalent to that of the conventional stepper motor shown in FIG. 40 is not generated. In order to overcome such a deficiency and thus provide a magnetic circuit equivalent to that of the conventional stepper motor shown in FIG. 40, the magnetic flux in the rotor 7 must be directed from the magnetized portion 7b to the magnetized portion 7d and from the magnetized portion 7c to the magnetized portion 7a, as well as in the above-mentioned directions.

Figure 28:
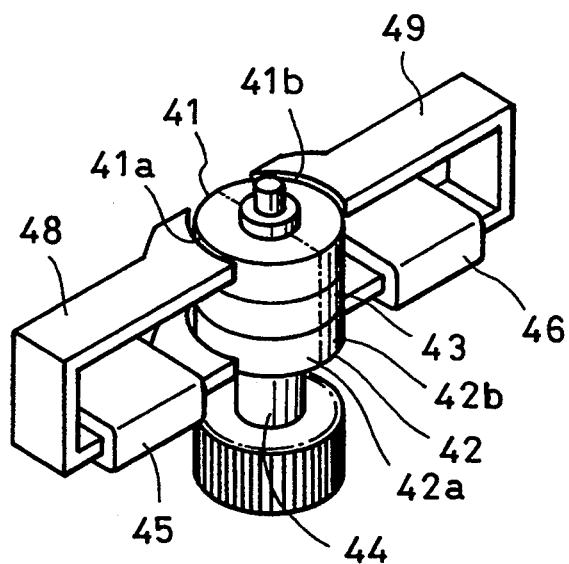
FIG. 28 is a perspective view of a tenth embodiment of the stepper motor according to the present invention.
Figure 29:
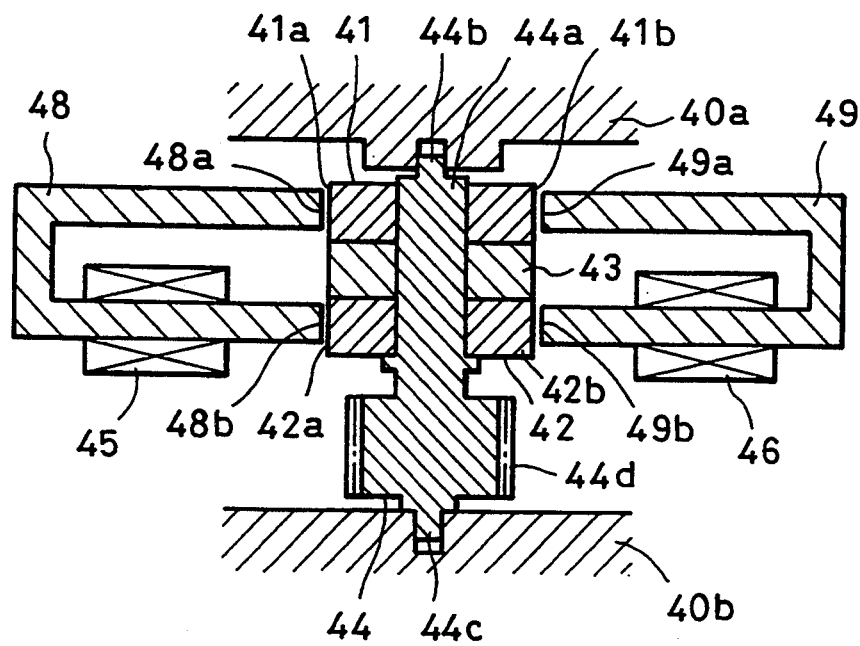
FIG. 29 is a plan view of the stepper motor shown in FIG. 28.

FIGS. 28 and 29 are respectively perspective and cross-sectional views of a tenth embodiment which has overcome the above-described deficiency. In these figures, a rotor member includes first and second rotor members 41 and 42 which are fixed to each other through a rotor shaft 44. The first rotor member 41 is made of a permanent magnet which has been magnetized such that a surface 41a thereof has a south pole while a surface 41b which is on the other side of the first rotor member 41 has a north pole. The second rotor member 42 is made of a permanent magnet which has been magnetized such that a surface 42a thereof has a north pole while a surface 42b which is on the other side of the first rotor member 41 has a south pole. The first and second rotor members 41 and 42 are fixed by the rotor shaft 44 such that the surface 42a is located below the surface 41a while the surface 42b is located below the surface 41b, i.e., the surfaces aligned in the vertical direction have opposite polarities.

A non-magnetic disk 43 made of a non-magnetic material is disposed between the first and second rotor members 41 and 42. The rotor shaft 44 is rotatably fixed to base plates 40a and 40b through two end portions 44b and 44c thereof, respectively. The first rotor member 41, the non-magnetic disk 43 and the second rotor member 42 are coaxially fixed to a shaft body 44a. The shaft body 44a of the rotor shaft 44 is made of at least a material having a high permeability, such as Permalloy or an electromagnetic soft iron, in order to make the magnetic flux flow easily in the first and second rotor members 41 and 42. The rotor shaft 44 has a gear portion 44d, which engages with a barrel feeding mechanism (not shown) or a shutter driving mechanism (not shown) to drive the same. The first rotor member 41, the non-magnetic disk 43 and the second rotor member 42 constitute a rotor.

A magnetic pole portion 48a of a first stator 48 opposes the first rotor member 41 with a small gap therebetween. A magnetic pole portion 48b of the first stator 48 opposes the second rotor member 42 with a small gap therebetween. Similarly, a magnetic pole portion 49a of a second stator 49 opposes the first rotor member 41 with a small gap therebetween, and a magnetic pole portion 49b opposes the second rotor member 42 with a small gap therebetween. Coils 45 and 46 are provided on stators 48 and 49, respectively.

The shaft body 44a of the rotor shaft 44 assures that the magnetic flux directed toward the inner diameter portion of the first and second rotor members 41 and 42 passes between the inner diameter portions of the first and second rotor members, when necessary, i.e., depending on the state of the external magnetic circuit generated by the first and second stators 48 and 49.

Therefore, whether the first and second rotor members 41 and 42 are made of an anisotropic or isotropic magnet, a magnetic circuit equivalent to that provided by the conventional stepper motor can be obtained.

Figure 30:
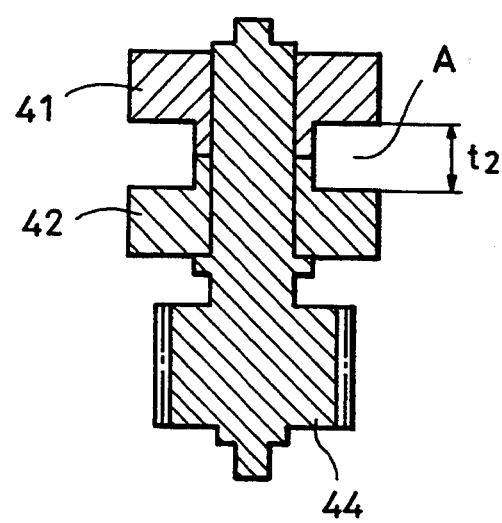
FIG. 30 is a cross-sectional view showing a modification of a rotor shaft of the stepper motor shown in FIG. 29.

FIG. 30 shows a modification of the rotor shaft of the stepper motor shown in FIG. 29. In this modification, there is a gap A having a length $t_2$ between the first and second rotor members 41 and 42. Therefore, passage of the magnetic flux between the undersurface of the first rotor member and the upper surface of the second rotor member is prevented.

Eleventh Embodiment

An eleventh embodiment is directed to the structure of the stepper motor which can be utilized to move a photographic lens of a camera without performing energization therefor even during the exposure operation. Twelfth and thirteenth embodiments, which will be described later, also have the same purpose.

Figure 31:
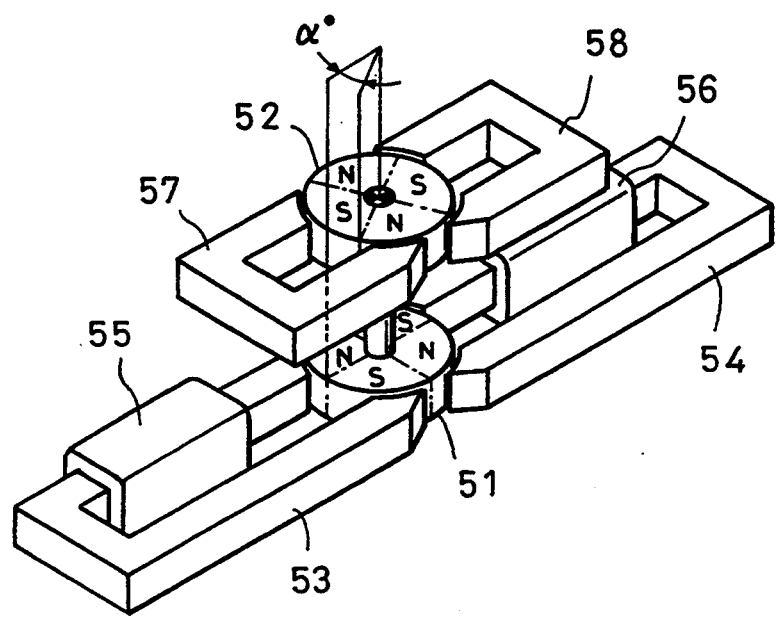
FIG. 31 is a perspective view of an eleventh embodiment of the stepper motor according to the present invention.

FIGS. 31 through 35 show a stepper motor employed in the eleventh embodiment of the present invention. Referring first to FIG. 31, a rotor includes first and second rotor members 51 and 52 which are fixed to each other by a rotor shaft. The rotor is rotatably mounted on a base plate (not shown). The first rotor member 51 is divided in the circumferential direction into four parts which have south and north magnetic poles alternately.

The first rotor member 51 has been magnetized in the radial direction. Similarly, the second rotor member 52 is divided in the circumferential direction into four parts which have south and north magnetic poles alternately. The direction of magnetization of the second rotor member 52 is in the radial direction. First and second stators 53 and 54 are disposed such that magnetic pole portions 53a, 53b and 54a, 54b (see FIG. 32) thereof oppose the magnetized portions of the first rotor 51. Coils 55 and 56 are disposed such that they energize the stators. Yokes 57 and 58 are disposed such that end portions 57a, 57b and 58a, 58b of yokes 57 and 58, respectively, oppose the second rotor member 52. The stators 53, 54 and yokes 57, 58 are made of a permeable material. The end portion 57a of the yoke 57 has substantially the same shape as that of the magnetic pole portion 53a of the stator 53. Similarly, the end portions 57b, 58a and 58b have substantially the same shapes as those of the magnetic pole portions 53b, 54a and 54b, respectively.

Figure 32:
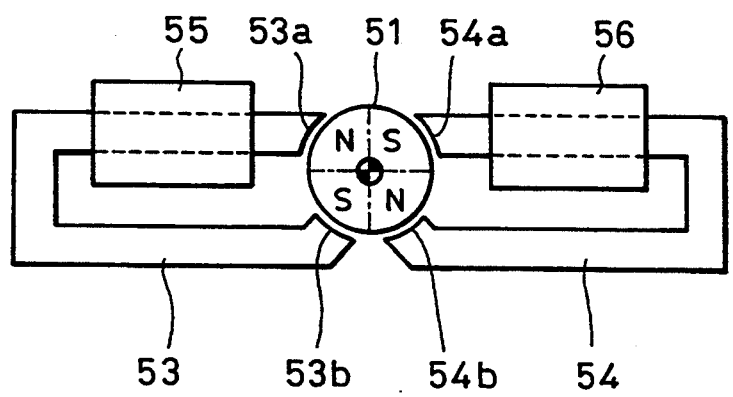
FIG. 32 is plan view of a rotor and stators in the stepper motor shown in FIG. 31.
Figure 33:
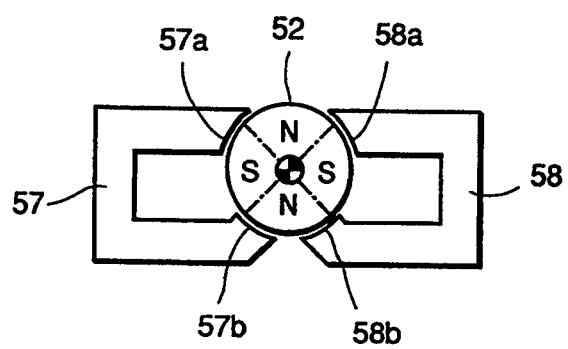
FIG. 33 is a plan view of the rotor and yokes in the stepper motor shown in FIG. 31.

FIG. 32 is a plan view showing the positional relation between the first rotor member 51 and the stators 53, 54. FIG. 33 is a plan view showing the positional relation between the second rotor member 52 and the yokes 57, 58. As can be seen from FIGS. 32 and 33, the relation of the polarities between the end portions 57a, 57b, 58a, 58b of the yokes 57, 58 and the magnetized portions of the second rotor member 52 is shifted by 45° from the relation of the polarities between the magnetic pole portions 53a, 53b, 54a, 54b of the stators 53, 54 and the magnetized portions of the first rotor member 51. In other words, in this embodiment, since the magnetic pole portions 53a, 53b, 54a, 54b of the stators 53, 54 are at the same positions as those of the end portions 57a, 57b, 58a, 58b of the yokes 57, 58 two-dimensionally in an x-y plane, the magnetized portions of the second rotor member 52 shift from the magnetized portions of the first rotor member 51 by 45°.

This angle of shift is 22.5° when the number of parts into which the first and second rotor members are divided is eight. Where n is the number of parts into which the first and second rotor members are divided, the angle of shift α is generally expressed by $\alpha = \frac{1}{2} \cdot 360°/n$.

Figure 34:
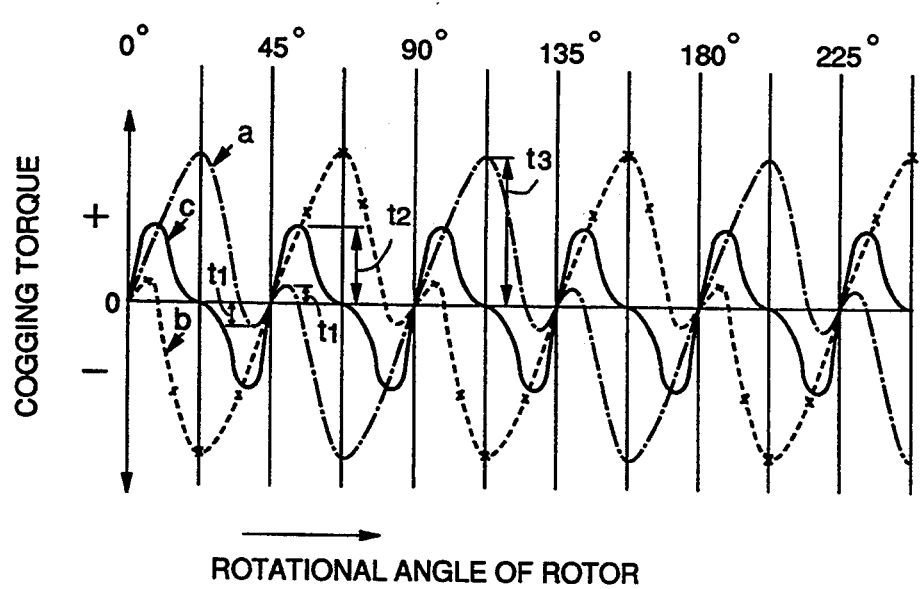
FIG. 34 is a graph showing the characteristics of the stepper motor shown in FIG. 31 in terms of the cogging torque.

FIG. 34 shows the cogging torque. In FIG. 34, the ordinate axis represents the cogging torque. + indicates the force which acts in a direction in which rotation is decelerated, and − indicates the force which acts in a direction in which rotation is accelerated. The abscissa axis represents the rotational angle of the rotor (the first rotor member). 0° indicates the state of the first rotor member shown in FIG. 32. a indicates the cogging torque which is applied to the first rotor member 51 due to the relation between the first rotor member 51 and the stators 53, 54.

It can be seen from FIG. 34 that the cogging torque is low, i.e., the torque $t_1$ required to move the rotor to the rotational position of 0° or 90° is low, in the vicinity of the position at which the rotor has rotated by 45° from the position shown in FIG. 32, and the rotor can thus readily be moved to the rotational position of 0° or 90° due to an impact or the like. b indicates the cogging torque which is applied to the second rotor member 52 due to the relation between the second rotor member 52 and the yokes 57, 58. Torque b is shifted from torque a by 45°.

Since the first and second rotor members 51 and 52 rotate together, the cogging torque which is applied to the entire rotor is a combination of a and b. This combined torque is indicated by c in FIG. 34. At the rotational position of 45°, the torque c required for the rotor to return to the rotational angle of 0° or 90° is $t_2$, which is larger than $t_1$. Thus, the rotor can be retained stably at the rotational angle of 45°. When the first rotor member 51 is at the rotational position of 0° or 90°, when the first rotor member 51 is at the position shown in FIG. 31 or has rotated by 90° from the position shown in FIG. 31, the cogging torque required for the rotor to withstand to move to a rotational angle of 45° is $t_2$, while $t_3$ is the cogging torque required for a conventional rotor to withstand, to move to a rotational angle of 45°, as shown in FIG. 34. In this embodiment, $t_3 > t_2$. In this embodiment, since the driving force generated by the stepper motor is the value obtained by deducting the cogging torque from the electromagnetic force generated as a consequence of energization of the coils 55, 56, the maximum cogging torque can be reduced. In other words, when the torque decreases from $t_3$ to $t_2$, the driving force generated by the stepper motor increases.

In this embodiment, there are two rotor members, the first and second rotor members, and the yokes 57, 58 oppose a rotor member other than the rotor member which the stators 53, 54 oppose. Thus, the yokes 57, 58 and the stators 53, 54 can be disposed at positions where they do not interfere with each other.

Figure 35:
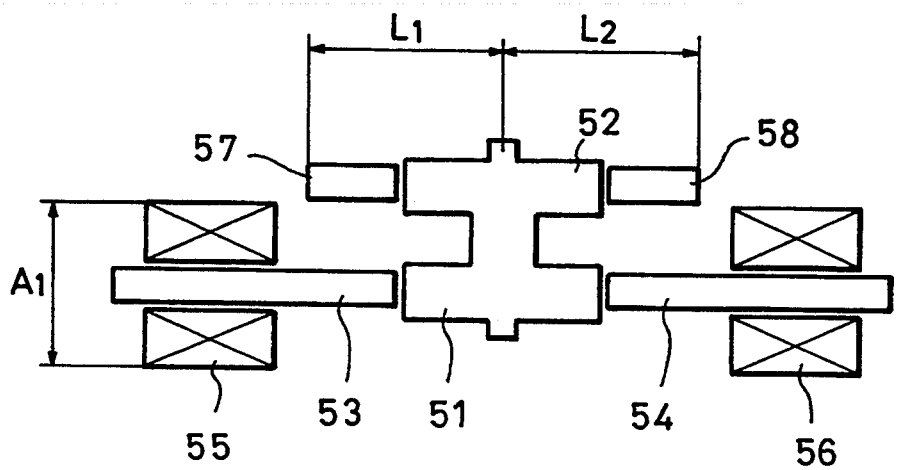
FIG. 35 is a cross-sectional view of the stepper motor shown in FIG. 31.

FIG. 35 is a cross-sectional view of the eleventh embodiment. As shown in FIG. 35, the yokes 57, 58 are within distances $L_1$, $L_2$ from the center of the rotor members 51 and 52 so that they do not interfere with the coils 55, 56 surrounding stators 53 and 54, respectively. Thus, the coils 55 and 56 can be disposed within a thickness $A_1$. Thus, the thickness of the entire stepper motor is no greater than that of a conventional stepper motor.

Twelfth Embodiment

Figure 36:
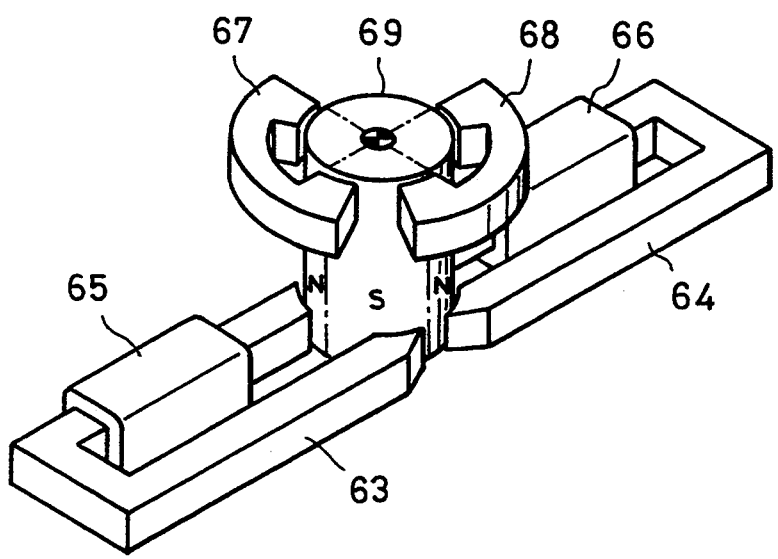
FIG. 36 is a perspective view of a twelfth embodiment of the stepper motor according to the present invention.
Figure 37:
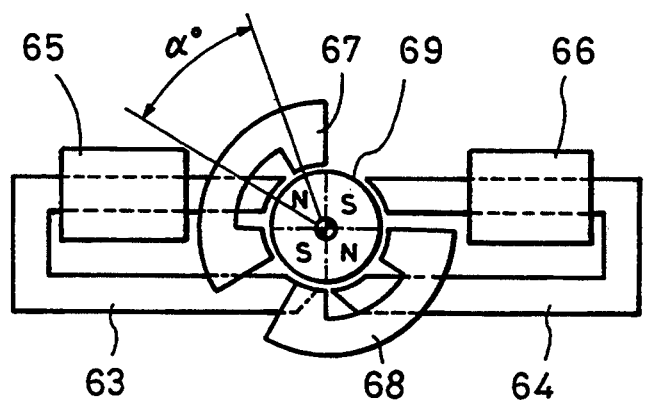
FIG. 37 is a plan view of the stepper motor shown in FIG. 36.

FIGS. 36 and 37 are respectively perspective and plan views of a twelfth embodiment of the present invention. As shown in these figures, a rotor 69 is divided into four portions by two perpendicularly intersecting diameters. The four portions of the rotor 69 have south and north poles alternately. The rotor 69 has been magnetized radially. Stators 63, 64 oppose the lower portions of the magnetized portions of the rotor 69, and yokes 67, 68 oppose the upper portions thereof. Coils 65 and 66 surround stators 63 and 64, respectively. The position at which the yokes 67, 68 oppose the rotor is offset from the position at which the stators 63, 64 oppose the rotor by an angle α which is 45°, as shown in FIG. 37. In this way, the twelfth embodiment offers the same advantage as that of the eleventh embodiment.

Thirteenth Embodiment

A thirteenth embodiment is directed to the structure of the stepper motor which has been improved further from that of the first embodiment from the same viewpoint as that of the eleventh and twelfth embodiments. In the first embodiment, the cogging torque is very high at the rotor's positions shown in FIGS. 5, 6, 9 and 11, and thus a sufficient driving force cannot be obtained when the coils 5, 6 are energized. A sufficient cogging torque is not generated at the rotor's positions shown in FIGS. 7, 8, 10 and 12, and thus the rotor cannot be held stably at these positions when the coils are not energized. In that case, the same effect as that obtained in the eleventh and twelfth embodiments can be obtained by disposing yokes at positions shifted by an angle which is half the magnetizing pitch of the rotor with respect to the corresponding stators. In other words, the thirteenth embodiment is a stepper motor in which a large driving force can be generated by reducing the cogging torque at the rotor positions shown in FIGS. 5, 6, 9 and 11 and increasing the cogging torque at the rotor positions shown in FIGS. 7, 8, 10 and 12 and in which the rotor can be stably retained at the four positions.

Figure 38:
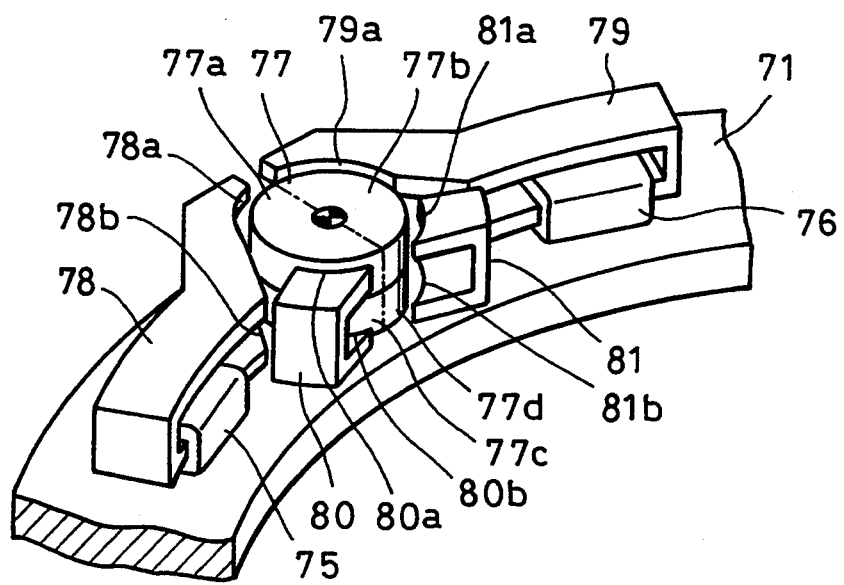
FIG. 38 is a perspective view of a thirteenth embodiment of the stepper motor according to the present invention.
Figure 39:
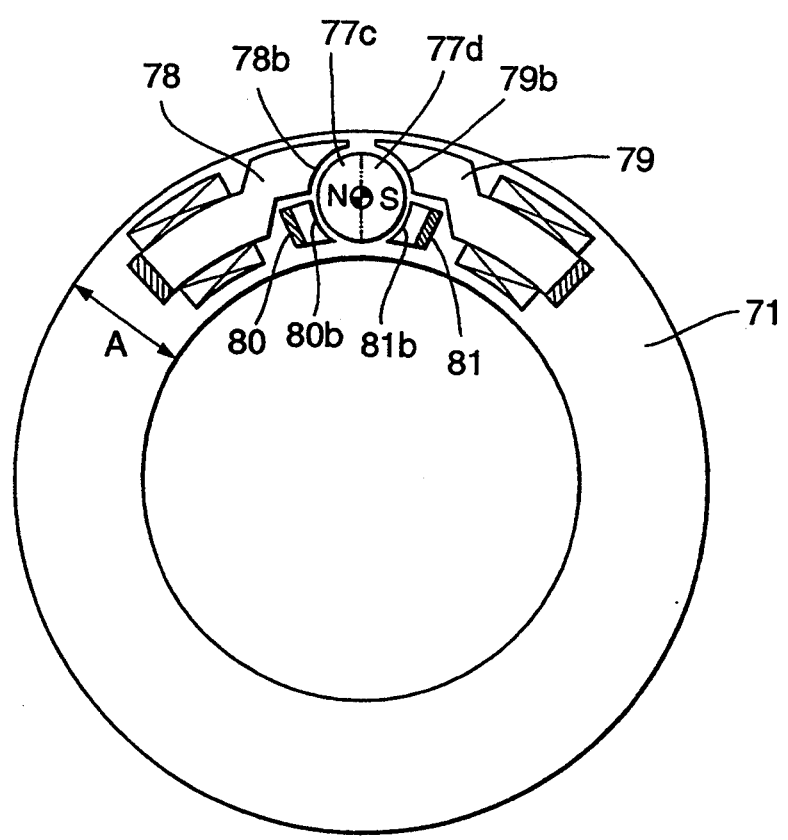
FIG. 39 is a plan view of the stepper motor shown in FIG. 38.

FIG. 38 is a perspective view of the stepper motor employed in the thirteenth embodiment. A first yoke 80 is fixed to a base plate 71. The first yoke 80 has end portions 80a, 80b at a position which is shifted by 90° from magnetic pole portions 78a, 78b of a first stator 78 with respect to the center of a rotor 77. A second yoke 81 is fixed to the base plate 71. The second yoke 81 has end portions 81a, 81b at a position which is shifted by 90° from magnetic pole portions 79a, 79b of a second stator 79 with respect to the center of the rotor 77. FIG. 39 is a plan view of the thirteenth embodiment.

In the thus-arranged thirteenth embodiment, the same amount of cogging torque is generated each time the rotor is rotated by 45°, and the rotor can thus be held stably each time it is rotated by 45°. Furthermore, since the maximum cogging torque is reduced, a large driving force can be obtained by energizing the coils. Furthermore, since the first and second yokes 80 and 81 can be disposed two-dimensionally between a coil 75 and the rotor 77 and between a coil 76 and the rotor 77, respectively, a dimension indicated by a bi-directional arrow A in FIG. 39 (in a radial direction) is not increased.

In this embodiment, rotor 77 has been magnetized no have two parts of different polarities in the circumferential direction and is divided into two magnetized layers in the axial direction thereof. Thus, parts 77a and 77b in the top layer have different polarities, as do parts 77c and 77d in the bottom layer. In addition, parts 77a and 77c, and parts 77b and 77d have different polarities.

As will be understood from the foregoing description, in the stepper motor according to the present invention, a plurality of magnetized portions are formed in the axial direction of the rotor, and the magnetic pole portions of the stator are aligned in the axial direction of the rotor so that they oppose the magnetized portions of the rotor. Thus, the two-dimensional size of the stepper motor can be reduced.

In the present invention, since a yoke, i.e., a rotor shaft, made of a permeable material is interposed at the central portion between the two rotor members, the two-dimensional size of the stepper motor can be reduced and a reduction in the generation of the driving torque can be prevented.

Furthermore, in the present invention, the rotor is divided into two rotor members or into two magnetized portions, and the yokes are disposed at positions shifted in the circumferential direction by an angle which is half the magnetizing pitch with respect to the stators such that they do not interfere the stators. Thus, in addition to the aforementioned advantages, the present invention has the following advantage without interfering with its compactness.

An adequate cogging torque is generated at each of the positions where the rotor is stopped. Consequently, the rotor can be stably retained even when the coils are deenergized, and a large driving force can be obtained by energizing the coils.

Furthermore, conventionally, the acceleration pattern of starting the rotor from a stable position differs from the acceleration pattern of starting the rotor from an unstable position. However, in the present invention, since the driving torque (energizing torque—cogging torque) is constant, the same acceleration pattern can be used for both the accelerating cases, simplifying the control method.

In the stepper motor according to the present invention, since a guide portion and an externally threaded portion are formed coaxially in the guide shaft fixed to the lens frame, the force of driving the lens frame along the optical axis acts at a position separated from the guide portion. Therefore, inclination of the lens or lens frame, deflection of the lens frame or an increase in the driving load due to an increase in the friction of the guide portion can be eliminated. Also, the two-dimensional shape of the lens barrel can be made compact.

Furthermore, in the present invention, since the gap near the upper and lower magnetic pole portions of the stator which correspond to the magnetized portions of the rotor is narrowed, the magnetic flux generated by energizing the coils passes near the rotor. Consequently, the magnetic flux generated by energizing the coils readily acts on the magnetic flux generated from the permanent magnet of the rotor, increasing the output level of the motor.

Furthermore, in the present invention, since the magnetic flux generated by the magnetized layer of the permanent magnet which opposes the magnetic pole located close to the coil is smaller than the magnetic flux generated by the magnetized layer of the permanent magnet which opposes the magnetic pole located remote from the coil, the magnetic flux generated by the magnetic pole portion of the stator as a consequence of energizing the coil balances the magnetic flux generated by the permanent magnet, thus increasing the output and efficiency of the stepper motor.

What is claimed is:

1. A stepper motor comprising:
   a cylindrical rotor made of a permanent magnet which has been magnetized radially, said rotor having two magnetized layers formed in an axial direction thereof;
   a plurality of stators, each of said stators having a plurality of magnetic pole portions which are disposed such that they oppose an outer periphery of said rotor, said magnetic pole portions of said stators opposing one of the magnetized layers of said rotor;
   a plurality of yokes made of a permeable material, said plurality of yokes being separated from said stators in the axial direction of said rotor, wherein end portions of said yokes oppose the other magnetized layer of said rotor, wherein said plurality of yokes are shifted from said stators at a predetermined angle; and
   a plurality of coils disposed such that each coil excites a corresponding stator.

2. A stepper motor comprising:
   a cylindrical rotor made of a permanent magnet which has been magnetized radially, said rotor having two rotor members which are disposed such that they oppose each other in an axial direction thereof, each of said two rotor members being formed as a layer in the axial direction having at least two portions radially magnetized and the adjacent magnetized portions having opposite polarities;

a plurality of stators having at least two magnetic pole portions which are disposed such that they oppose an outer periphery of said rotor so as to be disposed in the axial direction of said rotor, one of at least two magnetic pole portions of said plurality of stators being disposed such that one of at least two magnetic pole portions opposes one of two rotor members axially disposed as a layer and the other magnetic pole portion being disposed to oppose to the other rotor member; and a plurality of coils disposed such that each coil excites a corresponding stator.

3. The stepper motor according to claim 2, further comprising a permeable material disposed between said two rotor members.

4. The stepper motor according to claim 3, wherein said permeable material is a rotor shaft which fixes said rotor members at two ends thereof.

5. The stepper motor according to claim 3, wherein said two rotor members are provided with a gap therebetween.

6. A stepper motor comprising:

a cylindrical rotor made of a permanent magnet which has been magnetized radially, said rotor having two rotor members which are disposed such that they oppose each other in an axial direction of said rotor, each of said two rotor members having a plurality of magnetized layers which are formed in the axial direction of said rotor, each of said magnetized layers having at least two magnetized portions, the magnetized portions of adjacent magnetized layers having opposite polarities;

a plurality of stators, each having a plurality of magnetic pole portions which are disposed such that they oppose an outer periphery of said rotor, said plurality of magnetic pole portions of said plurality of stators being disposed such that they oppose said magnetized portions of said magnetized layers which are different in the axial direction of said rotor;

a plurality of coils disposed such that each coil excites a corresponding stator; and a plurality of yokes made of a permeable material, said plurality of yokes being disposed with respect to said stators in the axial direction of said rotor, said plurality of yokes being disposed with respect to said rotor at a different position from that of said plurality of stators so that end portions of said plurality of yokes oppose different magnetized portions of said magnetized layers in the axial direction of said rotor from those which said plurality of stators oppose.

7. A stepper motor comprising:

a cylindrical rotor made of a permanent magnet which has been magnetized radially, said rotor having two rotor members which are disposed in opposed relation in an axial direction thereof, one of said two rotor members having magnetized portions which are shifted from magnetized portions of the other rotor member by a predetermined angle;

a plurality of stators, each of said stators having a plurality of magnetic pole portions which are disposed such that they oppose an outer periphery of said rotor, said magnetic pole portions of said plurality of stators being disposed such that they oppose one of said rotor members of said rotor;

a plurality of yokes made of a permeable material, said plurality of yokes being disposed in the axial direction of said rotor with respect to said stators, wherein end portions of said yokes are disposed such that they oppose the other rotor member of said rotor; and a plurality of coils disposed such that each coil excites a corresponding stator.

8. A stepper motor comprising:

a cylindrical rotor made of a permanent magnet which has been magnetized radially, said rotor having a plurality of magnetized layers formed as a layer in an axial direction thereof, each of said magnetized layers having at least two portions radially magnetized, and said adjacent magnetized portions having opposite polarities;

a plurality of stators having at least two magnetic pole portions which are disposed such that they oppose an outer periphery of said rotor so as to be disposed in the axial direction of said rotor, one of at least two magnetic pole portions of said plurality of stators being disposed such that one of at least two magnetic pole portions opposes one of the magnetized layers of said rotor and the other magnetic pole portion opposes to the other magnetized layer of said rotor; and a plurality of coils disposed such that each coil excites a corresponding stator.

9. A stepper motor comprising:

a cylindrical rotor made of a permanent magnet which has been magnetized radially, said rotor having a plurality of magnetized layers formed in an axial direction thereof, each of said magnetized layers having at least two magnetized portions, said adjacent magnetized portions of adjacent magnetized layers having opposite polarities;

a plurality of stators, each having a plurality of magnetic pole portions which are disposed such that they oppose an outer periphery of said rotor, said plurality of magnetic pole portions of said plurality of stators opposing said magnetized portions of said magnetized layers which are different in the axial direction of said rotor;

a plurality of coils disposed such that each coil excites a corresponding stator; and a ring-shaped base plate comprising a lens barrel, said rotor and said plurality of stators with said plurality of coils provided thereon being disposed on said base plate.

10. A stepper motor for use in a lens driving device, said stepper motor comprising:

a lens frame;

a guide shaft provided on said lens frame, said guide shaft having an externally threaded portion and a guide portion which are formed coaxially;

a cylindrical rotor made of a permanent magnet which has been magnetized radially, said rotor having on an inner peripheral portion thereof an internally threaded portion which engages said externally threaded portion of said guide shaft, said rotor having a plurality of magnetized layers which are formed in an axial direction of said rotor;

a ring-shaped base plate having a guide which is fitted with said guide portion of said guide shaft in order to slidably support said guide shaft in the axial direction;

a plurality of stators, each of said stators having a plurality of magnetic pole portions which oppose an outer periphery of said rotor, said plurality of stators being disposed on said ring-shaped base plate; and a coil wound around each of said stators so as to excite each of said stators.

11. The stepper motor for use in a lens driving device according to claim 10, wherein each of said magnetized portions of said rotor has at least two magnetized portions, the magnetized portions of adjacent magnetized layers having opposite polarities, and wherein said plurality of magnetic pole portions of said plurality of stators oppose said magnetized portions of said magnetized layers which are different in the axial direction of said rotor.

* * * * *

UNITED STATES PATENT AND TRADEMARK OFFICE
CERTIFICATE OF CORRECTION

PATENT NO. : 5,384,506
DATED : January 24, 1995
INVENTOR(S) : CHIKARA AOSHIMA

It is certified that error appears in the above-indentified patent and that said Letters Patent is hereby corrected as shown below:

ON THE COVER PAGE

[56] References Cited

U.S. Patent Documents

"Christaens" should read --Christiaens--.

Foreign Patent Documents

"3180822  8/1991 Japan
 450810  4/1992 Japan" should read
--3-180822  8/1991 Japan
 4-50810  4/1992 Japan--.

COLUMN 1

Line 17, "sho" should read --Sho--.

COLUMN 12

Line 49, "of-the" should read --of the--.

COLUMN 13

Line 36, "Eight" should read --Eighth--.

COLUMN 14

Line 3, "employee" should read --employed--.

UNITED STATES PATENT AND TRADEMARK OFFICE
CERTIFICATE OF CORRECTION

PATENT NO. : 5,384,506

DATED : January 24, 1995

INVENTOR(S) : CHIKARA AOSHIMA

It is certified that error appears in the above-indentified patent and that said Letters Patent is hereby corrected as shown below:

COLUMN 19

Line 58, "interfere" should read --interfere with--.

Signed and Sealed this

Twenty-fifth Day of April, 1995

Attest:

BRUCE LEHMAN

Attesting Officer          Commissioner of Patents and Trademarks